United States Patent
Yasuda et al.

(10) Patent No.: US 12,542,659 B2
(45) Date of Patent: Feb. 3, 2026

(54) SHARED INFORMATION GENERATION IN CONTINUOUS-VARIABLE QUANTUM KEY DISTRIBUTION SYSTEM

(71) Applicant: NEC Corporation, Tokyo (JP)

(72) Inventors: Wakako Yasuda, Tokyo (JP); Tetsuo Kawakami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 76 days.

(21) Appl. No.: 18/442,142

(22) Filed: Feb. 15, 2024

(65) Prior Publication Data

US 2024/0283638 A1 Aug. 22, 2024

(30) Foreign Application Priority Data

Feb. 21, 2023 (JP) .................. 2023-025203

(51) Int. Cl.
*H04L 9/08* (2006.01)

(52) U.S. Cl.
CPC .......... *H04L 9/0852* (2013.01); *H04L 9/0819* (2013.01); *H04L 9/085* (2013.01)

(58) Field of Classification Search
CPC ... H04L 9/0852; H04L 9/0858; H04L 9/0855; H04L 63/061; H04L 9/083; H04L 9/0822; H04L 9/3226; H04L 9/0891; H04L 9/14; H04L 9/0827; H04L 2209/24; H04L 9/08; H04L 9/0819; H04L 9/088; H04L 9/0869; H04W 12/041; H04W 12/0431; H04W 12/0433; H04W 12/04; H04W 12/61; H04W 12/63; H04W 12/71; G06F 21/31; G06F 21/44; G06F 7/588; G06F 21/72; G06F 21/86

USPC ........ 380/279, 255, 264, 276; 726/2, 21, 36; 713/150, 163, 181
See application file for complete search history.

(56) References Cited

U.S. PATENT DOCUMENTS

| | | | | |
|---|---|---|---|---|
| 5,764,765 A * | 6/1998 | Phoenix | ........... | H04L 9/0858 380/256 |
| 6,748,083 B2 * | 6/2004 | Hughes | ........... | H04L 9/0858 380/278 |
| 7,437,081 B2 * | 10/2008 | Mitchell | ........... | H04B 10/70 398/154 |
| 8,855,316 B2 * | 10/2014 | Wiseman | ........... | H04L 9/0855 380/278 |
| 9,960,465 B2 * | 5/2018 | Dudley | ........... | H01M 50/204 |
| 10,057,058 B2 * | 8/2018 | Murakami | ........... | H04L 9/0858 |

(Continued)

FOREIGN PATENT DOCUMENTS

JP 4124194 B2 7/2008
JP 2019-522394 A 8/2019

*Primary Examiner* — Sharif E Ullah
(74) *Attorney, Agent, or Firm* — Sughrue Mion, PLLC

(57) ABSTRACT

Shared information generation technique including key generation rate and soft-decision error correction in CV-QKD is disclosed. A receiver is configured to: set reference bit positions for basis reconciliation according to the reference bit positions with a transmitter, to generate sifted key quantization data; performs hard decision on a part of the sifted key quantization data to generate hard-decision data; perform bit position synchronization decision whether bit position synchronization is established; and in response to establishment of bit position synchronization, performs soft-decision error correction processing to generate shared information.

20 Claims, 11 Drawing Sheets

(56) References Cited

U.S. PATENT DOCUMENTS

| | | | | |
|---|---|---|---|---|
| 2005/0138352 A1* | 6/2005 | Gauvreau | H04L 9/3247 | 713/153 |
| 2005/0221759 A1* | 10/2005 | Spadafora | G08G 1/093 | 455/39 |
| 2007/0065154 A1* | 3/2007 | Luo | H04J 14/0282 | 398/141 |
| 2007/0076884 A1* | 4/2007 | Wellbrock | H04L 9/0855 | 380/263 |
| 2007/0195774 A1* | 8/2007 | Sherman | H04L 69/16 | 370/392 |
| 2011/0206204 A1* | 8/2011 | Sychev | H04J 14/06 | 380/256 |
| 2011/0213979 A1* | 9/2011 | Wiseman | H04L 9/0844 | 713/171 |
| 2011/0243331 A1* | 10/2011 | Yasuda | H04L 9/0836 | 380/46 |
| 2012/0045208 A1* | 2/2012 | Yasuda | H04B 10/60 | 398/65 |
| 2012/0082464 A1* | 4/2012 | Yasuda | H04B 10/6166 | 398/152 |
| 2012/0237202 A1* | 9/2012 | Abe | H04B 10/6164 | 398/16 |
| 2013/0051790 A1* | 2/2013 | Yasuda | H04B 10/6151 | 398/16 |
| 2013/0266308 A1* | 10/2013 | Fukuchi | H04B 10/616 | 398/16 |
| 2014/0010234 A1* | 1/2014 | Patel | H04L 45/74 | 370/392 |
| 2014/0068765 A1* | 3/2014 | Choi | H04L 63/1416 | 726/23 |
| 2014/0133652 A1* | 5/2014 | Oshida | H04L 9/0897 | 380/255 |
| 2014/0286638 A1* | 9/2014 | Yasuda | H04J 14/06 | 398/65 |
| 2015/0372765 A1* | 12/2015 | Yasuda | H04B 10/613 | 398/29 |
| 2016/0036554 A1* | 2/2016 | Yasuda | H04J 14/06 | 398/65 |
| 2016/0050025 A1* | 2/2016 | Yasuda | H04B 10/6165 | 398/65 |
| 2016/0155327 A1* | 6/2016 | Schlienz | G08G 1/096791 | 340/907 |
| 2016/0241396 A1* | 8/2016 | Fu | H04L 9/0836 | |
| 2016/0359626 A1* | 12/2016 | Fu | H04L 9/0858 | |
| 2016/0366094 A1* | 12/2016 | Mason | H04L 61/5038 | |
| 2017/0214525 A1* | 7/2017 | Zhao | H04W 12/0431 | |
| 2017/0230173 A1* | 8/2017 | Choi | H04L 9/0861 | |
| 2017/0338895 A1* | 11/2017 | Yasuda | H04B 10/6971 | |
| 2017/0338952 A1* | 11/2017 | Hong | H04L 9/083 | |
| 2018/0176091 A1* | 6/2018 | Yoon | H04L 5/1446 | |
| 2018/0248582 A1* | 8/2018 | Yasuda | H04J 11/00 | |
| 2019/0036821 A1* | 1/2019 | Levy | G06F 12/0868 | |
| 2019/0115983 A1* | 4/2019 | Yasuda | H04B 10/612 | |
| 2019/0260581 A1* | 8/2019 | Su | H04L 9/08 | |
| 2019/0349392 A1* | 11/2019 | Wetterwald | H04L 43/0852 | |
| 2020/0084222 A1* | 3/2020 | William | H04L 63/12 | |
| 2022/0360434 A1* | 11/2022 | Choi | H04L 63/061 | |
| 2024/0283638 A1* | 8/2024 | Yasuda | H04L 9/085 | |
| 2025/0141671 A1* | 5/2025 | Kawakami | H04L 9/0869 | |

* cited by examiner

SHARED INFORMATION GENERATION IN CONTINUOUS-VARIABLE QUANTUM KEY DISTRIBUTION SYSTEM

INCORPORATION BY REFERENCE

This application is based upon and claims the benefit of priority from Japanese Patent Application No. 2023-025203, filed on Feb. 21, 2023, the disclosure of which is incorporated herein in its entirety by reference.

BACKGROUND ART

The present invention relates to quantum key distribution techniques, and more particularly to techniques for generating shared information between a transmitter and a receiver.

Quantum key distribution (hereinafter referred to as QKD) is a well-known technique allowing secure key sharing between two remote locations by means of single-photon transmission of a sequence of random numbers as the source of a cryptographic key. The single-photon transmission quantum-mechanically assures that the cryptographic key is leak-proof, and thus achieves a high degree of confidentiality. For this reason, it is expected to be used for cryptographic communications that handle important confidential information.

As shown in FIG. 1, QKD is composed of four steps: 1) very weak light transmission, 2) basis reconciliation, 3) error correction, and 4) privacy amplification.

(1) There are two types of very weak light transmission: discrete-variable QKD (DV-QKD), in which a single photon is transmitted through a quantum channel; and continuous-variable QKD (CV-QKD), in which the quadrature amplitude of the light is modulated and transmitted. In DV-QKD, the presence or absence of a photon is detected using a photon detector, and the cryptographic key is generated from the detected data (see, for example, PTL 1). Accordingly, it requires special devices such as a single-photon generating source and a single-photon detector. In contrast, in CV-QKD, the state of optical field is measured by coherent detection, and the encryption key is generated from the measured data (see, for example, PTL 2). Coherent detection is a commonly used technique in long-haul and large-capacity optical communications, so it can be realized using ordinary optical components. Accordingly, CV-QKD is expected to be less expensive than DV-QKD.

(2) In basis reconciliation, basis information is exchanged between the transmitter and receiver through an optical channel of normal intensity level (classical channel) to sift basis-matched bits from the received information. At that time, it is necessary for the transmitter and receiver to agree on which bit of the transmitted basis information corresponds to which bit transmitted in the quantum channel (establishment of bit position synchronization). PTL 1 discloses a method of establishing bit position synchronization based on the error rate of received information in DV-QKD.

(3) Error correction is performed on the sifted information (sifted key) obtained by basis reconciliation. In PTL 1, hard-decision values are used as input data. The hard decision is a two-level decision with respect to an arbitrary threshold value.

(4) Privacy amplification is the process of generating a new random number sequence (final key) which can be obtained by deleting the amount of information that may have been leaked during key delivery based on a random number (parity calculation bits) generated in the transmitter. An eavesdropper cannot get the final key after the privacy amplification without knowing all of the parity calculation bits.

PATENT LITERATURE (PTL 1) Japanese Patent No. 4124194
(PTL 2) Japanese Patent Unexamined Publication No. 2019-522394

SUMMARY

As described above, it is necessary to establish synchronization of bit positions between the transmitter and receiver in a QKD system. The establishment of synchronization of bit positions is a prerequisite for the key generation flow. The final key cannot be generated unless synchronization is established.

PTL 1 discloses a bit position synchronization method based on DV-QKD, which judges the success or failure of establishing bit position synchronization by calculating the bit error rate of the sifted key obtained by hard decision. Accordingly, error correction after having established synchronization is also limited to hard-decision error correction.

Unlike hard-decision error correction, soft-decision error correction is more complex to implement, but is expected to significantly improve error correction performance and increase the key generation rate. However, the bit position synchronization method of PTL 1 needs to be limited to hard-decision error correction. PTL 2 is silent on error correction for CV-QKD.

The sifted key obtained by basis reconciliation is subjected to hard-decision error correction inputting hard-decision values as described in PTL 1. Accordingly, in CV-QKD, the bit position synchronization described in PTL 1 cannot be performed until after the completion of error correction.

However, error correction often fails. When error correction fails, it is difficult to determine whether the failure is due to loss of synchronization of bit positions in basis reconciliation or failed error correction. The handling of data that error correction fails is dependent on system implementation. For example, data that error correction fails may be discarded or error correction may be performed again.

In the method of discarding failed data, the data is discarded even when error correction fails due only to loss of synchronization of bit positions during basis reconciliation. In other words, the data is discarded even when error correction fails due to misalignment of bit positions during basis reconciliation, even though the sequence of the data is correct. As a result, the key generation rate is reduced.

In addition, the method of redoing error correction increases the computational load when soft-decision error correction is employed in CV-QKD. Furthermore, as described above, it is necessary to perform the bit position synchronization decision after error determination, which increases the feedback loop, resulting in a reduction in throughput and, consequently, a reduction in the key generation rate.

Therefore, an object of the present invention is to provide a shared information generation technique that can improve key generation rate when performing soft-decision error correction in CV-QKD.

According to an aspect of the invention, a communication device connected to another communication device through a first channel and a second channel in a continuous-variable quantum key distribution (CV-QKD) system, the communication device includes: a quantum unit configured to receive signal light from the another communication device through the first channel to generate received quantization data by coherent detection, wherein the signal light is quadrature-modulated according to a first random number sequence and a second random number sequence which have predetermined bit positions at the another communication device; and at least one processor configured to generate shared information from the received quantization data by communicating with the another communication device through the second channel, wherein the at least one processor is further configured to: a) set reference bit positions for basis reconciliation with the another communication device, wherein the basis reconciliation generates sifted key quantization data from the received quantization data according to the reference bit positions; b) perform hard decision on a part of the sifted key quantization data to generate hard-decision data; and c) perform bit position synchronization decision whether bit position synchronization is established between the hard-decision data and sifted key data which is obtained by the basis reconciliation at the another communication device, d) in response to establishment of bit position synchronization, perform soft-decision error correction processing between the communication device and the another communication device to generate the shared information.

According to an aspect of the invention, a communication control method at a communication device connected to another communication device through a first channel and a second channel in a continuous-variable quantum key distribution (CV-QKD) system, the method includes: by a quantum unit, receiving signal light from the another communication device through the first channel to generate received quantization data by coherent detection, wherein the signal light is quadrature-modulated according to a first random number sequence and a second random number sequence which have predetermined bit positions at the another communication device; and by at least one data processor, a) setting reference bit positions for basis reconciliation with the another communication device, wherein the basis reconciliation generates sifted key quantization data from the received quantization data according to the reference bit positions; b) performing hard decision on a part of the sifted key quantization data to generate hard-decision data; and c) performing bit position synchronization decision whether bit position synchronization is established between the hard-decision data and sifted key data which is obtained by the basis reconciliation at the another communication device; and d) in response to establishment of bit position synchronization, performing soft-decision error correction processing between the communication device and the another communication device to generate the shared information.

According to an aspect of the present invention, a method for generating shared information by continuous-variable quantum key distribution (CV-QKD) between a first communication device and a second communication device connected through a first channel and a second channel, the method includes: a) at the first communication device, transmitting signal light to the second communication device through the first channel, wherein the signal light is quadrature-modulated according to a first random number sequence and a second random number sequence which have predetermined bit positions at the first communication device; b) at the second communication device, generating received quantization data by performing coherent detection of signal light arriving through the first channel; c) at the second communication device, setting reference bit positions for basis reconciliation with the first communication device, wherein the basis reconciliation generates sifted key quantization data from the received quantization data according to the reference bit positions; and at the first communication device, generating sifted key data by the basis reconciliation from the second random number sequence; d) at the second communication device, performing hard decision on a part of the sifted key quantization data to generate hard-decision data; e) at one of the first and second communication devices, performing bit position synchronization decision whether bit position synchronization is established between the hard-decision data and the sifted key data, f) in response to establishment of bit position synchronization, performing soft-decision error correction processing between the first communication device and the second communication device to generate the shared information.

According to the present invention, it is possible to improve the error correction performance and the key generation rate by checking the synchronization of bit positions in basis reconciliation before soft-decision error correction in CV-QKD.

DETAILED DESCRIPTION

Outline of Example Embodiments

According to an example embodiment of the present invention, a hard decision is partly made to establish synchronization of bit positions in basis reconciliation before performing a soft-decision error correction process. More specifically, assuming that a CV-QKD system includes a transmission-side communication device (first communication device or transmitter) and a reception-side communication device (second communication device or receiver), the CV-QKD system operates as follows. The receiver makes hard decision on a part of sifted key quantization data obtained by basis reconciliation. The synchronization decision of bit positions is made based on the hard decision data thus obtained and the sifted key data on the transmitter.

When bit position synchronization has been established, data used for hard decision is discarded. Subsequently, the remaining sifted key quantization data on the receiver and the remaining sifted key data on the transmitter are used to perform the soft-decision error correction process, thereby generating shared information at both of the transmitter and receiver.

As described above, the establishment of synchronization of bit positions in basis reconciliation is completed before soft-decision error correction, allowing suppressed error correction failures due to synchronization error in bit positions. In addition, employing soft-decision error correction in CV-QKD improves error correction performance, resulting in increased key generation rate. Hereinafter, the example embodiments and examples of the present invention will be described in detail with reference to the drawings.

1. Example Embodiment 1.1) System Configuration

Figure 1:
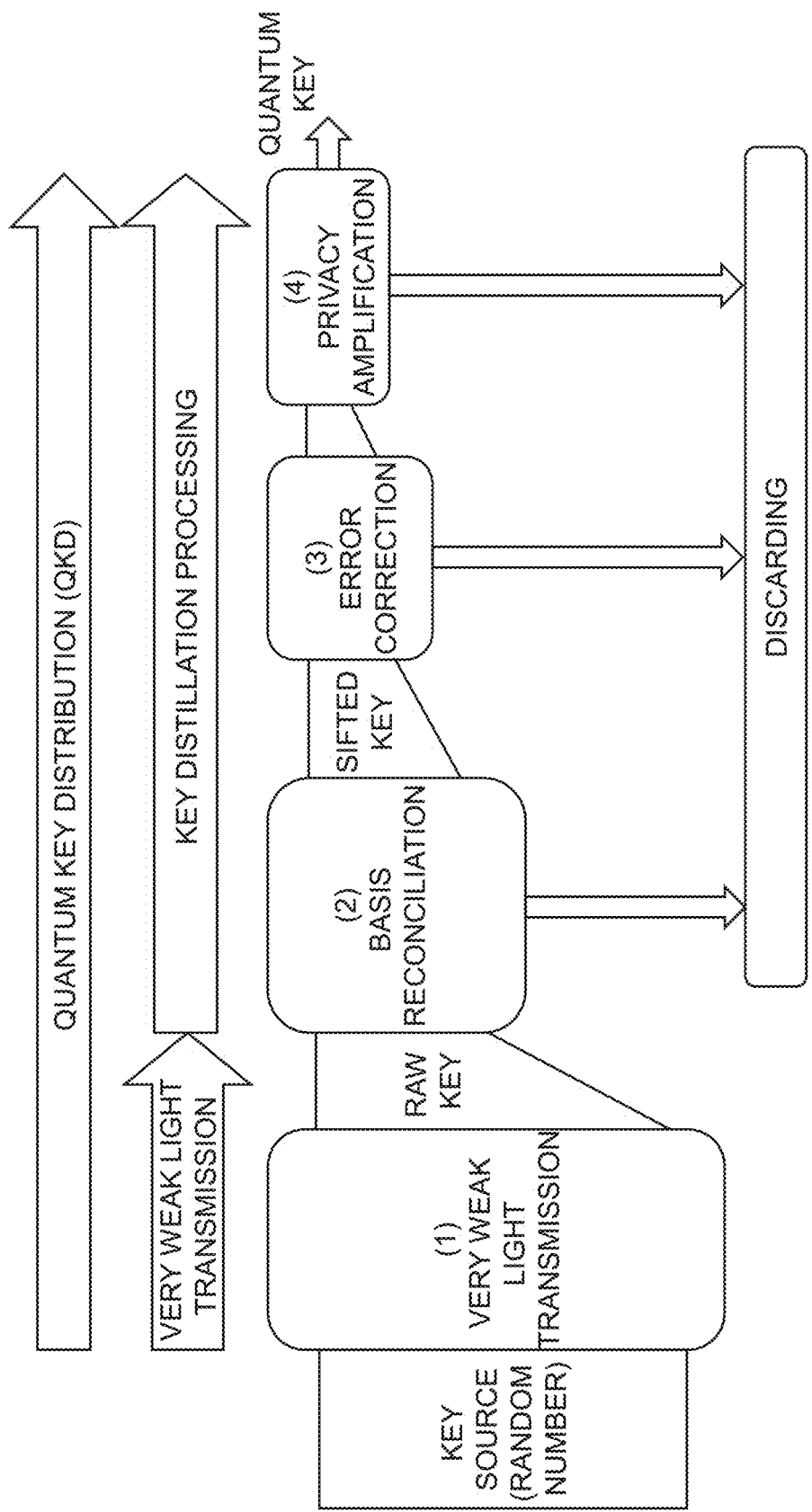
FIG. 1 is a schematic diagram showing a quantum key generation process in QKD as a background technique.
Figure 2:
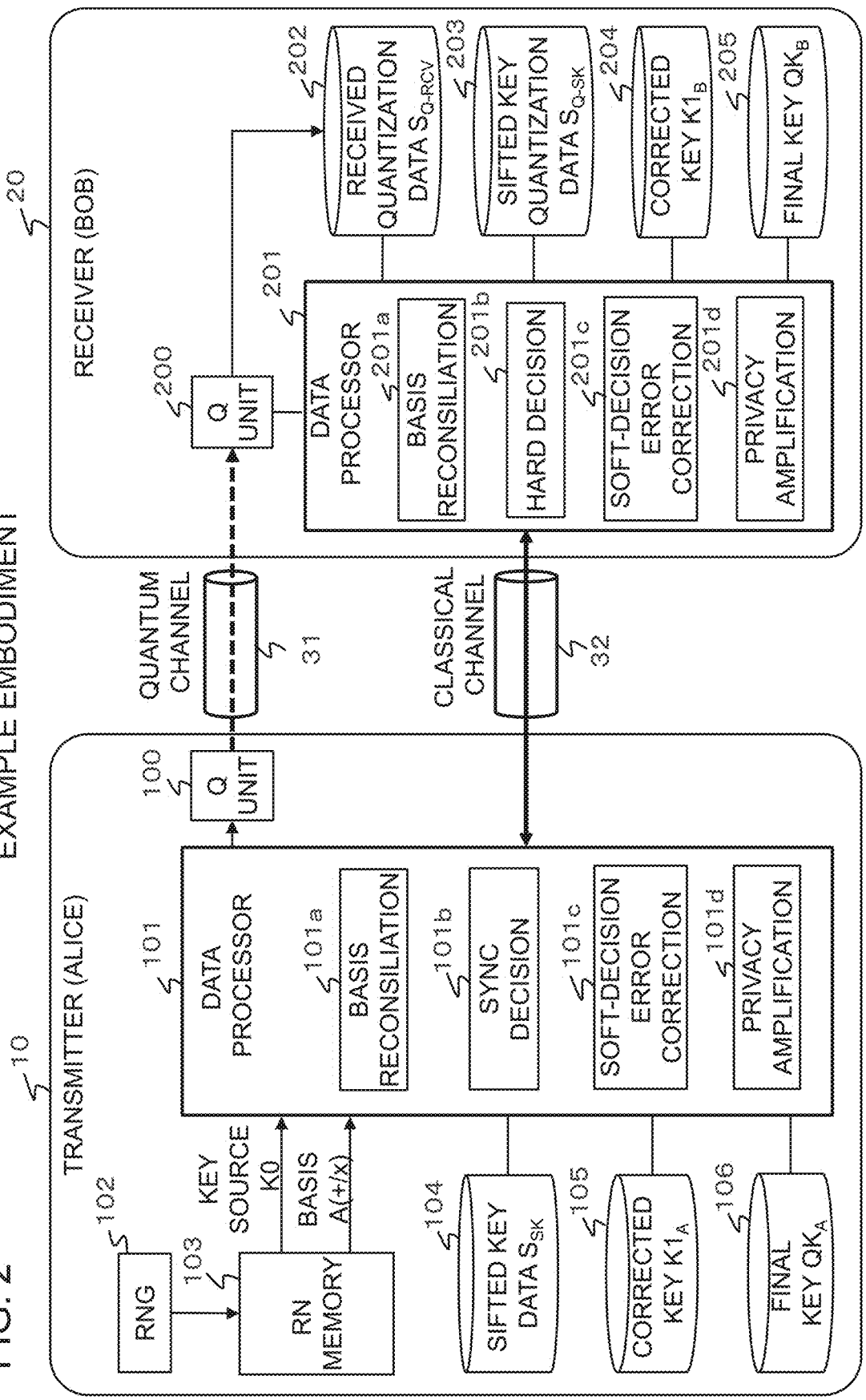
FIG. 2 is a block diagram illustrating a schematic configuration of a CV-QKD system according to an example embodiment of the present invention.

As illustrated in FIG. 2, a CV-QKD system according to the present embodiment includes a transmitter 10 and a receiver 20, which are connected by a quantum channel 31 and a classical channel 32. Here, the quantum channel 31 is a communication channel through which very weak signal light is transmitted from the transmitter 10 to the receiver 20. The very weak signal light has an optical power of less than 1 photon/bit. Accordingly, the quantum channel is a relatively lossy, noisy and error-prone channel, which means that the quantum channel is less reliable than a normal or classical channel.

The classical channel 32 is a commonly-used communication channel through which optical signals at normal intensities are transmitted. Accordingly, the classical channel 32 is a substantially error-free communication channel and has sufficiently high communication reliability. For this reason, the classical channel 32 is used to exchange information necessary for the transmitter 10 and receiver 20 to perform basis reconciliation, error correction, and privacy amplification. The quantum channel 31 and the classical channel 32 may be physically separate transmission channels, or may be multiplexed into a single optical transmission channel.

The transmitter 10 includes the following functional sections: a quantum (Q) unit 100 that transmits very weak signal light for CV-QKD; a data processor 101 that implements key generation processing functions; a random number generator (RNG) 102; a random number (RN) memory 103; a sifted key data storage section 104; a corrected key storage section 105; and a final key storage section 106. Note that data communication with the receiver 20 through the classical channels may be performed through a communication unit (not shown in FIG. 2).

Random numbers generated by the random number generator 102 are stored in the random number memory 103. The random numbers stored in the random number memory 103 are accessed by the data processor 101 in the key generation process as described below, and are supplied as key source K0 and basis A. Under the control of the data processor 101, the quantum unit 100 transmits very weak signal light quadrature-modulated according to the random numbers (key sources K0 and basis A) to the receiver 20 through the quantum channel 31.

The data processor 101 may include at least one processor, which implements a function of controlling the general transmission operation of the transmitter 10 and a key generation function. The key generation function includes a basis reconciliation section 101a, synchronization decision section 101b, soft-decision error correction section 101c, and privacy amplification section 101d, which will be described below. The key generation function may be implemented by software running on at least one processor such as CPU (Central Processing Unit), or by hardware such as FPGA (Field-Programmable Gate Array) or ASIC (Application-Specific Integrated Circuit). The sifted key data $S_{SK}$ generated by the basis reconciliation section 101a is stored in the sifted key data storage section 104. The corrected key $K1_A$ which is first shared information generated by the soft-decision error correction section 101c is stored in the corrected key storage section 105. The final key $QK_A$ generated by the privacy amplification section 101d is stored in the final key storage section 106.

The receiver 20 includes a quantum (Q) unit 200 that receives very weak signal light for CV-QKD, a data processor 201 that implements a key generation processing function, a received quantization data storage section 202, a sifted key quantization data storage section 203, a corrected key storage section 204, and a final key storage section 205. Note that data communication with the transmitter 10 through the classical channel 32 may be performed through a communication section (not shown in FIG. 2).

The data processor 201 implements a function of controlling the general reception operation of the receiver 20 and a key generation function. The key generation function includes a basis reconciliation section 201a, hard decision section 201b, soft-decision error correction section 201c, and privacy amplification section 201d, which will be described below. The key generation function may be implemented by software running on a processor such as a CPU (Central Processing Unit) or by hardware such as an FPGA or ASIC.

The quantum unit 200 receives the very weak signal light arriving from the transmitter 10 through the quantum channel 31 and stores the received quantization data $S_{Q-RCV}$ in the received quantization data storage section 202 as described below. The data processor 201 accesses the received quantization data $S_{Q-RCV}$ in the process of generating a quantum key as described below. The sifted key quantization data $S_{Q-SK}$ generated by the basis reconciliation section 201a is stored in the sifted key quantization data storage section 203 A corrected key $K1_B$, which is second shared information generated by the soft-decision error correction section 201c, is stored in the corrected key storage section 204. A final key $QK_B$ generated by the privacy amplification section 201d is stored in the final key storage section 205.

1.2) Key Generation Process

Figure 3:
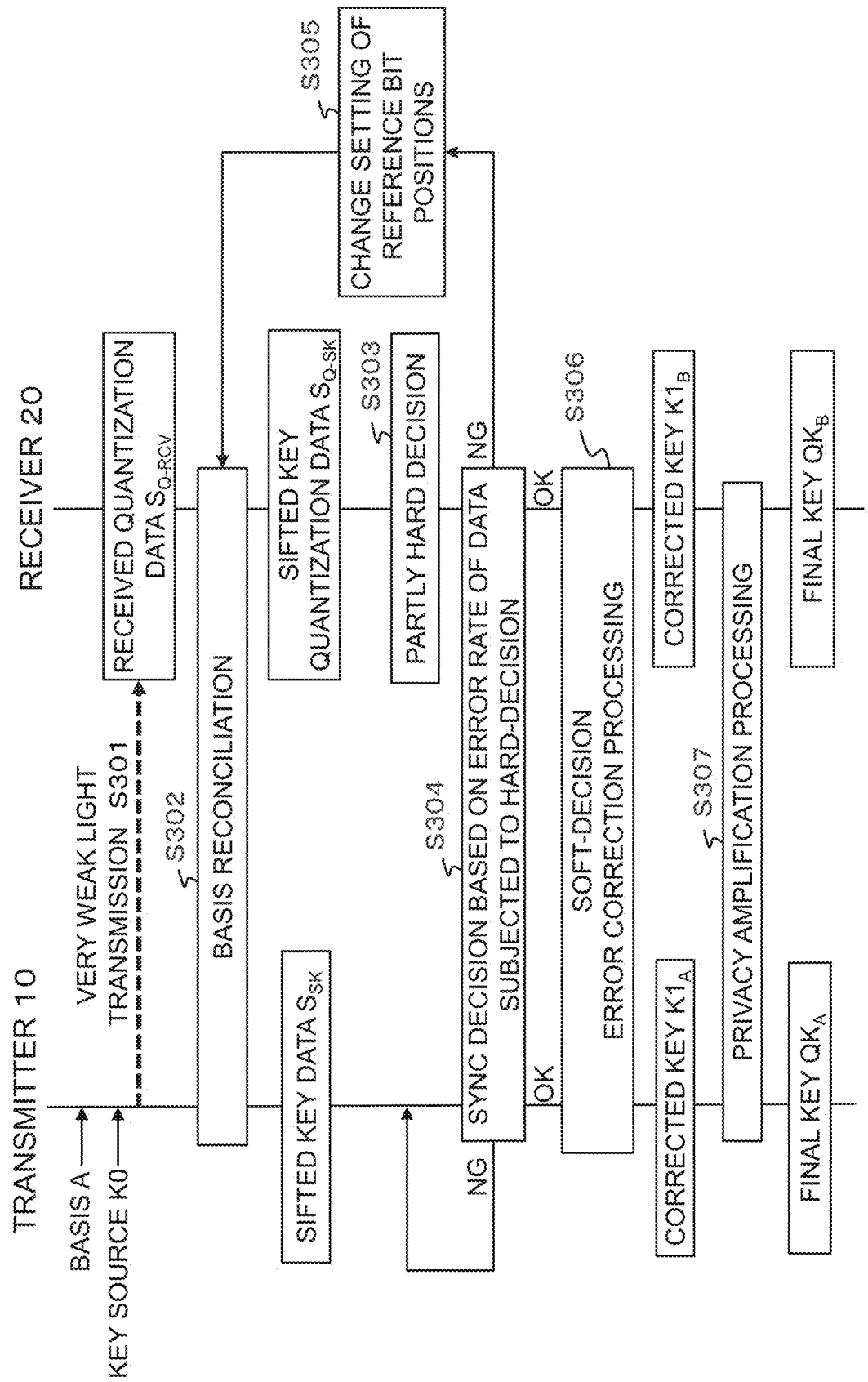
FIG. 3 is a sequence diagram illustrating the generation of a final key in a shared information generation method according to the example embodiment.

As illustrated in FIG. 3, the CV-QKD system according to the present example embodiment sequentially performs the following operations: very weak light transmission S301, basis reconciliation S302, hard decision S303 at the receiver 20, synchronization decision S304 based on the error rate of data subjected to hard decision, basis position setting change S305, soft-decision error correction S306, and privacy amplification S307. These operations are sequentially performed to generate the final keys $QK_A$ and $QK_B$. The detailed description will be given with reference to FIGS. 3-7.

Very Weak Light Transmission

Figure 4:
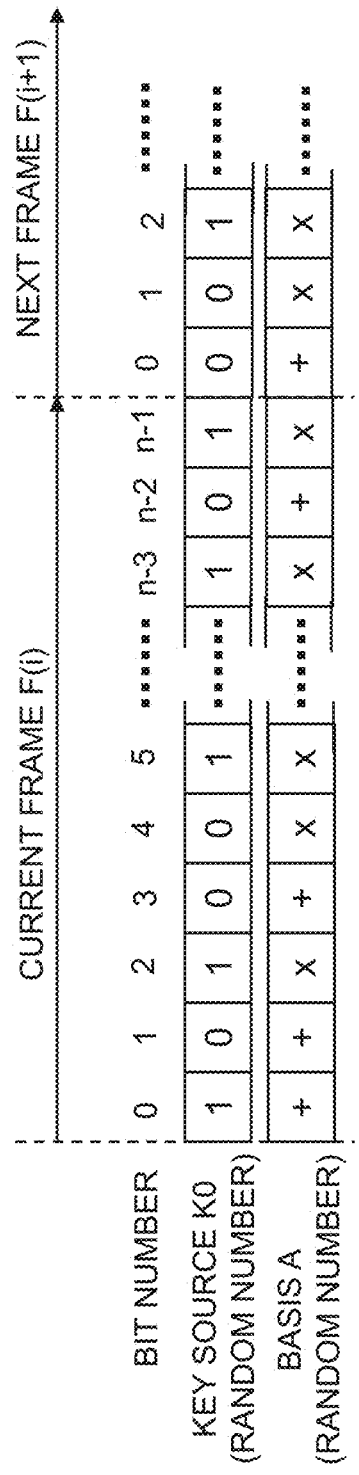
FIG. 4 is a diagram illustrating an example of the frame structure of transmission bit sequence and basis in the transmitter (Alice).
Figure 5:
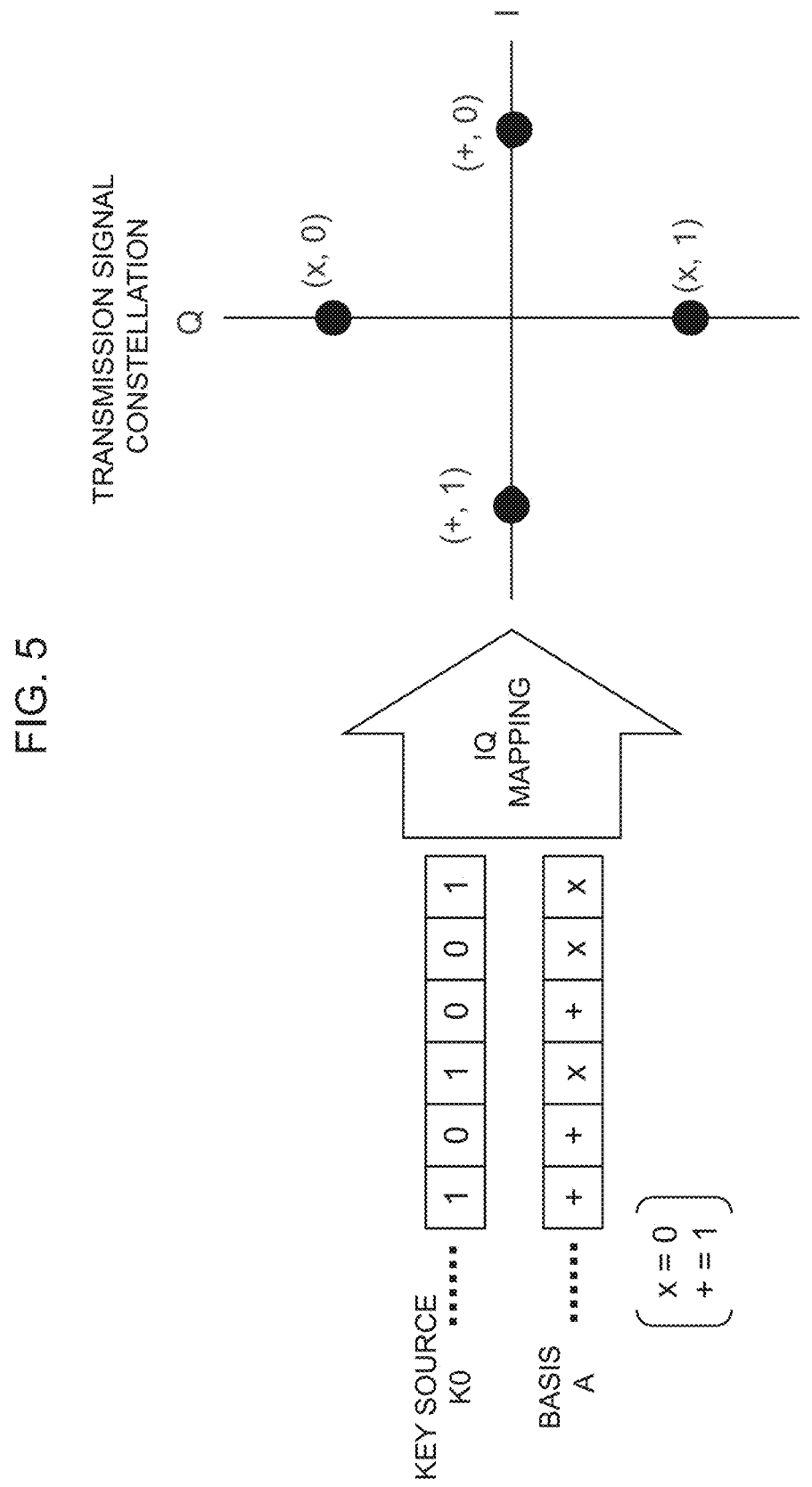
FIG. 5 is a diagram illustrating an example of the mapping of the transmission bit sequence and basis to I-Q plane in the transmitter (Alice).

As illustrated in FIGS. 4 and 5, it is assumed that the quantum unit 100 of the transmitter 10 transmits very weak signal light quadrature-modulated according to key source K0 and basis A (S301). The key source K0 is a sequence of random numbers from which a final key is generated. The basis A is also a sequence of random numbers consisting of 0/1 which is denoted by x/+, respectively, for the sake of explanation. A random number sequence of key source K0 and basis A may be framed every predetermined number of random numbers. The random numbers in each frame may be numbered as illustrated in FIG. 4. In an example as shown in FIG. 4, a second bit position (bit number=1) is indicated by a pair of key source K0="0" and basis A="+". The transmitter 10 can inform the receiver 20 of the bit number or basis information through the classical channel 32.

As illustrated in FIG. 5, a 2-bit random number consisting of key source K0 and basis A is mapped to one of the four signal points on the IQ plane (IQ modulation). For example, if the basis A="x", then a key source K0="1" is placed at the signal point (x, 1) and K0="0" is placed at the signal point (x, 0). In other words, I and Q signals with a phase difference of 90° Correspond to the values (+/x) of basis A, respectively, and the respective signal values 0/1 correspond to the key source K0. In other words, when the basis A="+", amplitude modulation is performed along the I axis, and when A="x", amplitude modulation is performed along the Q axis.

Such IQ modulation can be achieved by a Mach-Zehnder QPSK (Quadrature Phase Sifted keying) modulator. In FIG. 5, a phase modulation of depth 0° is performed when (base A, key source K0)=(+, 0) and a phase modulation of depth 180° when (A, K0)=(+, 1). A phase modulation of depth 90° is performed when (A, K0)=(x, 0) and a phase modulation of depth 270° is performed when (A, K0)=(x, 1). In other words, the very weak light is subjected to any one of phase modulations of 0°, 90°, 180° and 270° depending on a random sequence of key source K0 and basis A and is transmitted from the quantum unit 100 to the receiver 20 through the quantum channel 31.

If no quantum fluctuation exists, there would be no variation in the measured values at the receiver 20 as shown in the transmission signal constellation of FIG. 5. However, quantum fluctuations cause variations in the amplitude measurements of the received signal. The received state caused by quantum fluctuations may be illustrated as the received quantization data $S_{Q-RCV}$ of FIG. 6.

Figure 6:
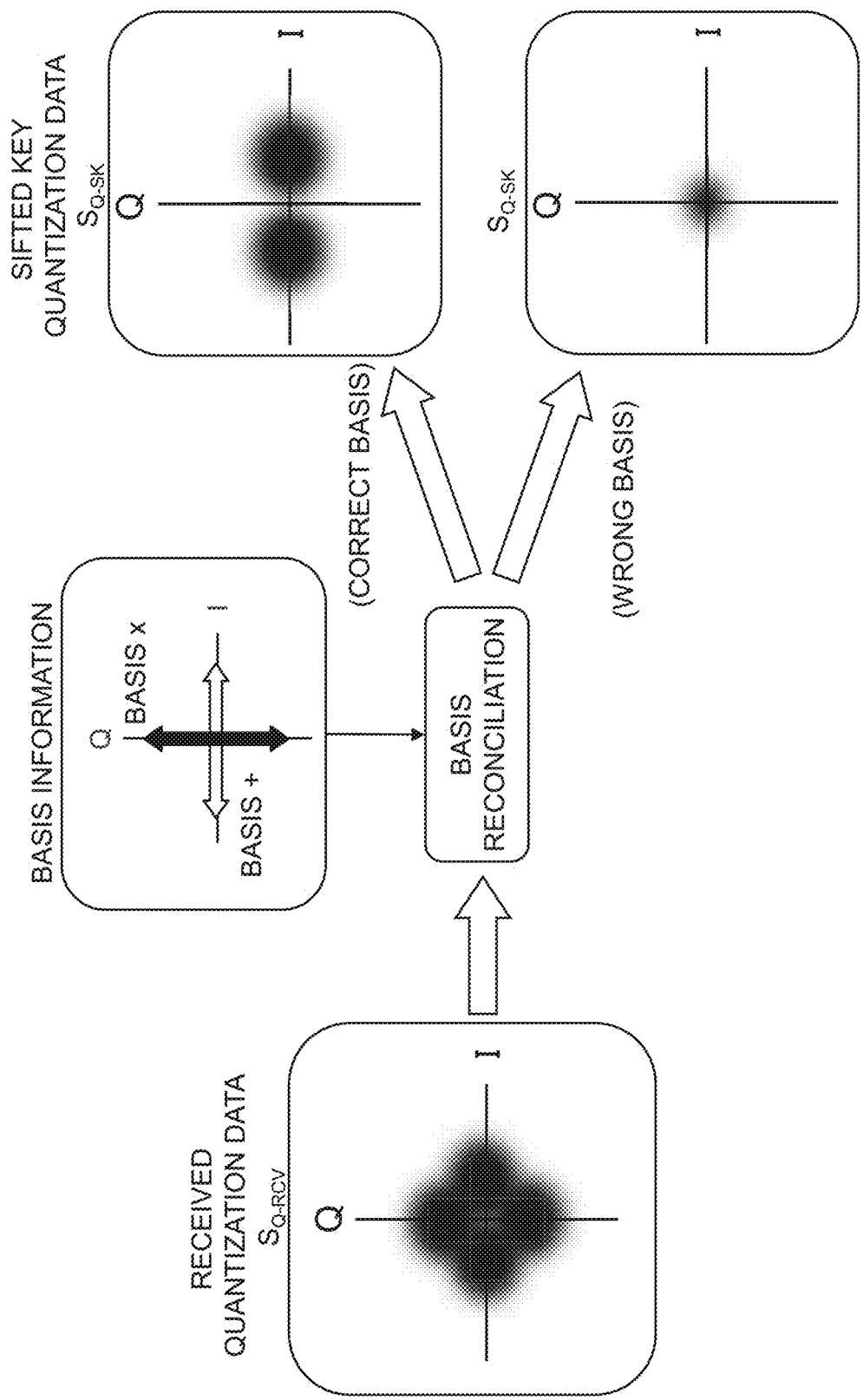
FIG. 6 is a schematic diagram illustrating basis reconciliation in the receiver (Bob).

As illustrated in FIG. 6, the received quantization data $S_{Q-RCV}$ may be imaged as partially overlapping distributions of four states of quadrature amplitude. Accordingly, they cannot in principle be clearly distinguished. Especially when the optical power of the very weak light is less than one photon/bit, it becomes difficult to precisely distinguish which state the received data is in. The received quantization data $S_{Q-RCV}$ is quantization data of the received signal as a continuous state in which the distributions of four states of quadrature amplitude partially overlap. The data processor 201 of the receiver 20 numbers the bits in sequence as reference bit positions and stores the receive quantization data $S_{Q-RCV}$ together with the reference bit positions in the received quantization data storage section 202.

Basis Reconciliation

As illustrated in FIG. 6, if the basis A (+ or x) of the very weak light generated by the transmitter 10 is shown, then the receiver 20 can perform basis reconciliation according to the reference bit position based on the basis information to generate sifted key quantization data $S_{Q-SK}$ (S302 in FIG. 3). Assuming that the reference bit positions are correct, if the basis A is "+", then the I axis is selected for the received quantization data $S_{Q-RCV}$ to generate quantization data which is one of two regions on the I axis of IQ plane (correct basis). If basis A is "x", then the Q axis is selected for the received quantization data $S_{Q-RCV}$ to yield quantization data which is one of two regions on the Q axis of IQ plane. Accordingly, the two regions on the Q axis is rotated −90° to produce quantization data which is one of the two regions on the I axis (correct basis). In this manner, the correct basis reconciliation is performed at the correct reference bit positions, allowing sifted key quantization data to be generated. As described later, this sifted key quantization data can be subjected to the soft decision processing to determine a symbol value corresponding to the sifted key quantization data.

In contrast, if there is a misalignment of reference bit positions between the transmitter 10 and the receiver 20, basis reconciliation is performed based on erroneous basis, making correct symbol determination impossible (wrong basis). More specifically, assuming that a transmission basis A is "+" but a reception basis is "x" due to the misalignment of reference bit positions, the basis reconciliation performed based on erroneous basis generates only quantization data distributed near the origin of the IQ plane as labeled with "wrong basis" in FIG. 6. Such quantization data makes it impossible to determine which symbol the sifted key quantization data $S_{Q-RCV}$ corresponds to.

There are two methods for basis reconciliation S302. The first method is that the transmitter 10 transmits all the bases A to the receiver 20 through the classical channel 32. The second method is that the basis A of the transmitter 10 is compared to the basis B of the receiver 20 through the classical channel 32, and only the matched basis is adopted. These methods will be described in detail in first and second examples, respectively.

In the transmitter 10, the data processor 101 generates sifted key data $S_{SK}$ from the key source K0 according to all or some bases adopted by the basis reconciliation and stores them in the sifted key data storage section 104. In receiver 20, the data processor 201 sets reference bit positions for generating shared key, generates sifted key quantization data $S_{Q-SK}$ according to the bases adopted by basis reconciliation, and stores it in the sifted key quantization data storage 203.

Synchronization Decision Based on Hard Decision

The data processor 201 of the receiver 20 reads a predetermined frame portion of the sifted key quantization data $S_{Q-SK}$ and performs a hard decision to determine a value of 0 or 1 with respect to at least one threshold value for quantization of that predetermined frame portion (S303 in FIG. 3). The hard-decision data of the predetermined frame portion is compared with the data of a counterpart frame portion of the sifted key data $S_{SK}$ in the transmitter 10 to calculate an error rate.

If the error rate is not greater than a predetermined threshold, the synchronization is judged as OK. If the error rate exceeds the predetermined threshold, specifically in the neighborhood of 50% (within a predetermined range), the synchronization is judged as NG (S304 in FIG. 3). If the hard-decision data and the counterpart data of the sifted key data $S_{SK}$ are randomly different, there will be no correlation at all between the transmitter 10 and receiver 20, and the error rate may be distributed in the neighborhood of 50%. Accordingly, the predetermined threshold can be set to a value smaller than 50%, e.g., between 15 and 50%, so that synchronization determination is made effectively possible.

Figure 7:
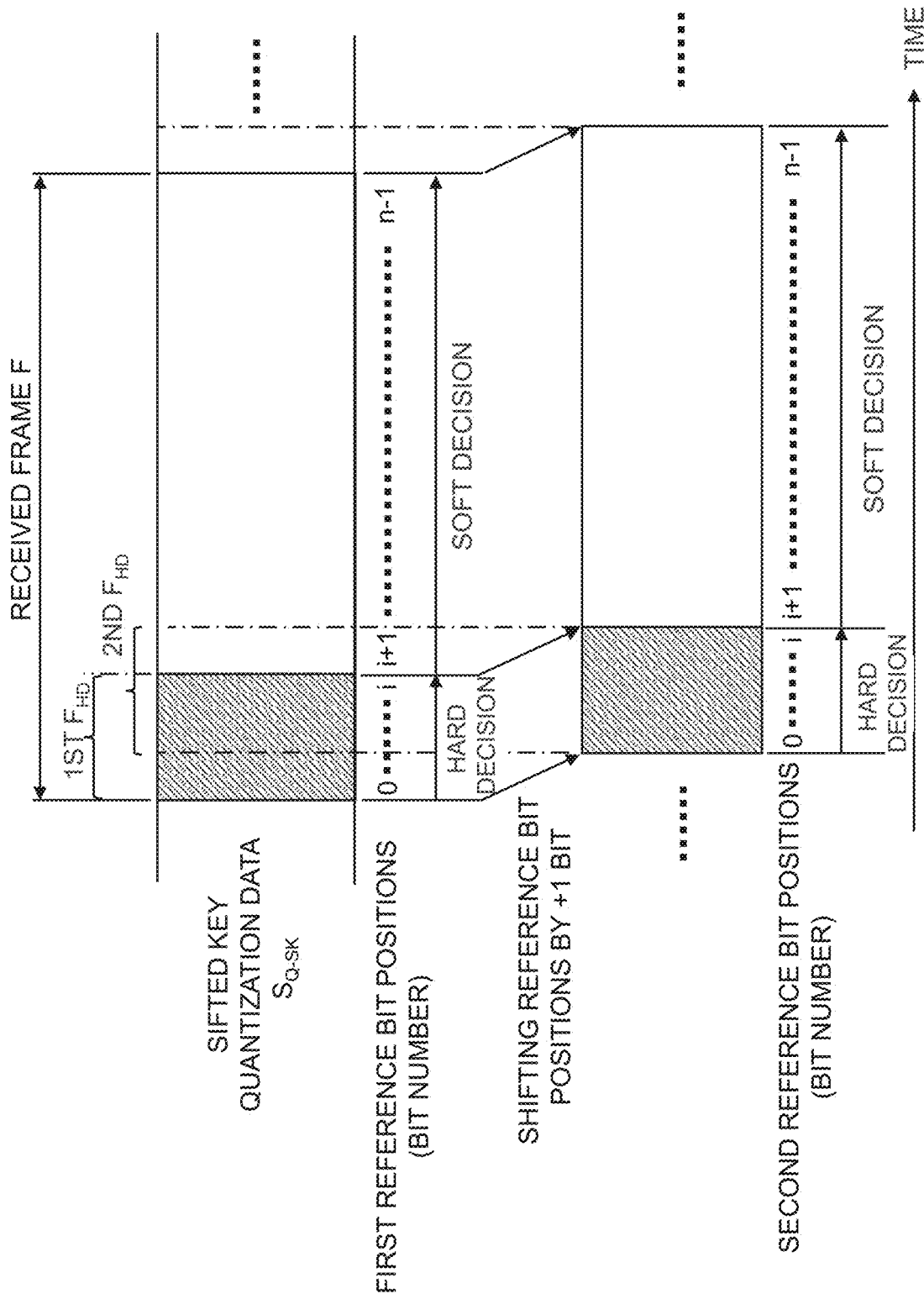
FIG. 7 is a schematic diagram illustrating an example of frame portions for hard and soft decisions in the shared information generation method according to the example embodiment.

As illustrated in FIG. 7, hard decision is performed on a predetermined frame portion $F_{HD}$ (about several percent of the frame length) at the beginning of a received frame F in the sifted key quantization data $S_{Q-SK}$. It is assumed in FIG. 7 that the time axis indicates the direction from bit number 0 to n−1 of the received frame F with respect to first reference bit positions. Sifted key quantization data indicated by bit numbers 0-i (first frame portion $F_{HD}$, or a portion on the time axis) of the received frame F is subjected to hard-decision to obtain hard-decision data. Since reference bit positions (bit numbers) are used as reference, the random number sequence of a frame in the sifted key quantization data $S_{Q-SK}$ can be changed by sequentially incrementing the bit numbers by +1 to shift the reference bit positions. In this manner, the resultant hard decision data can be changed.

As described above, the error rate is calculated from the hard-decision data and the corresponding portion of the sifted key data $S_{SK}$ generated at the transmitter 10. If the error rate is smaller than or equal to the predetermined threshold (synchronization OK), the first frame portion 1st-$F_{HD}$ used for hard decision is discarded and the remaining bit numbers (i+1) to (n−1) of the sifted key quantization data $S_{Q-SK}$ is used for soft-decision error correction processing, as described below.

If the error rate exceeds the predetermined threshold (synchronization NG), the data processor 201 changes the first reference bit positions to the second reference bit positions as described above (S305 in FIG. 3), thereby performing hard decision on the second frame portion 2nd-$F_{HD}$ in the sifted key quantization data $S_{Q-SK}$ to do the synchronization decision. As an example, the setting of the reference bit positions may be simply changed by sliding the reference bit positions by a predetermined number of bits (S305 in FIG. 3).

If synchronization is NG, the same synchronization decision may be repeated a predetermined number of times while discarding a predetermined frame portion used for error rate calculation. However, if synchronization is not established even after repeating the synchronization decision a predetermined number of times, the frame in question may be discarded and the synchronization decision may be performed for the next frame. The error rate for synchronization decision is calculated from the hard decision data obtained at the receiver 20 and the corresponding portion of the sifted key data obtained at the transmitter 10. Accordingly, the synchronization decision may be performed at either the transmitter 10 or the receiver 20.

Soft-Decision Error Correction

If synchronization is OK at synchronization decision S304 (see FIG. 3), the data processor 201 of the receiver 20 executes the soft-decision error correction processing on the remaining quantization data $S_{Q-SK}$ by communicating with transmitter 10 (S306 in FIG. 3). As described in detail below, the data processor 201 calculates error correction information (syndrome) for soft-decision error correction and transmits it to the transmitter 10. The data processor 101 of the transmitter 10 uses the syndrome to correct the sifted key data $S_{SK}$, thereby generating a corrected key $K1_A$. The data processor 201 of the receiver 20 generates a corrected key $K1_B$ by performing hard decision on the remaining quantization data $S_{Q-SK}$.

Privacy Amplification

When the corrected keys $K1_A$ and $K1_B$ have been generated at the transmitter 10 and the receiver 20, respectively, the data processors 101 and 201 execute the privacy amplification processing (S307 in FIG. 3). The privacy amplification is a process of removing the amount of information that may have been leaked during the key generation process and generating new random numbers as final keys $QK_A$ and $QK_B$, respectively.

1.3) Advantageous Effect

As described above, according to the present example embodiment, the receiver performs hard decision on a portion of the sifted key quantization data obtained by basis reconciliation. The hard-decision data and the sifted key data generated at the transmitter are used to perform synchronization decision of bit positions.

When synchronization is established, the data used for synchronization decision between the transmitter 10 and the receiver 20 are discarded, and the remaining sifted key quantization data at the receiver and the remaining sifted key data at the transmitter are used to perform soft-decision error correction processing. As a result, shared information (corrected key $K1_A$ and corrected key $K1_B$) is generated in both of the transmitter and the receiver.

According to the present example embodiment, the establishment of synchronization of bit positions in basis reconciliation is confirmed by hard-decision of a portion of the quantization data on the receiver before performing the soft-decision error correction. This can suppress error correction failures caused by synchronization errors in bit position, thereby improving error correction performance and key generation rate in CV-QKD.

Even if the bit positions are out of synchronization, the bits of received data are renumbered to generate shared information again without terminating the key generation flow. In this manner, in the CV-QKD system, even if the synchronization is lost, the received quantization data generated by QKD can be used as it is for the synchronization decision, allowing stable and fast key generation in CV-QKD.

2. First Example 2.1) System Configuration

Figure 8:
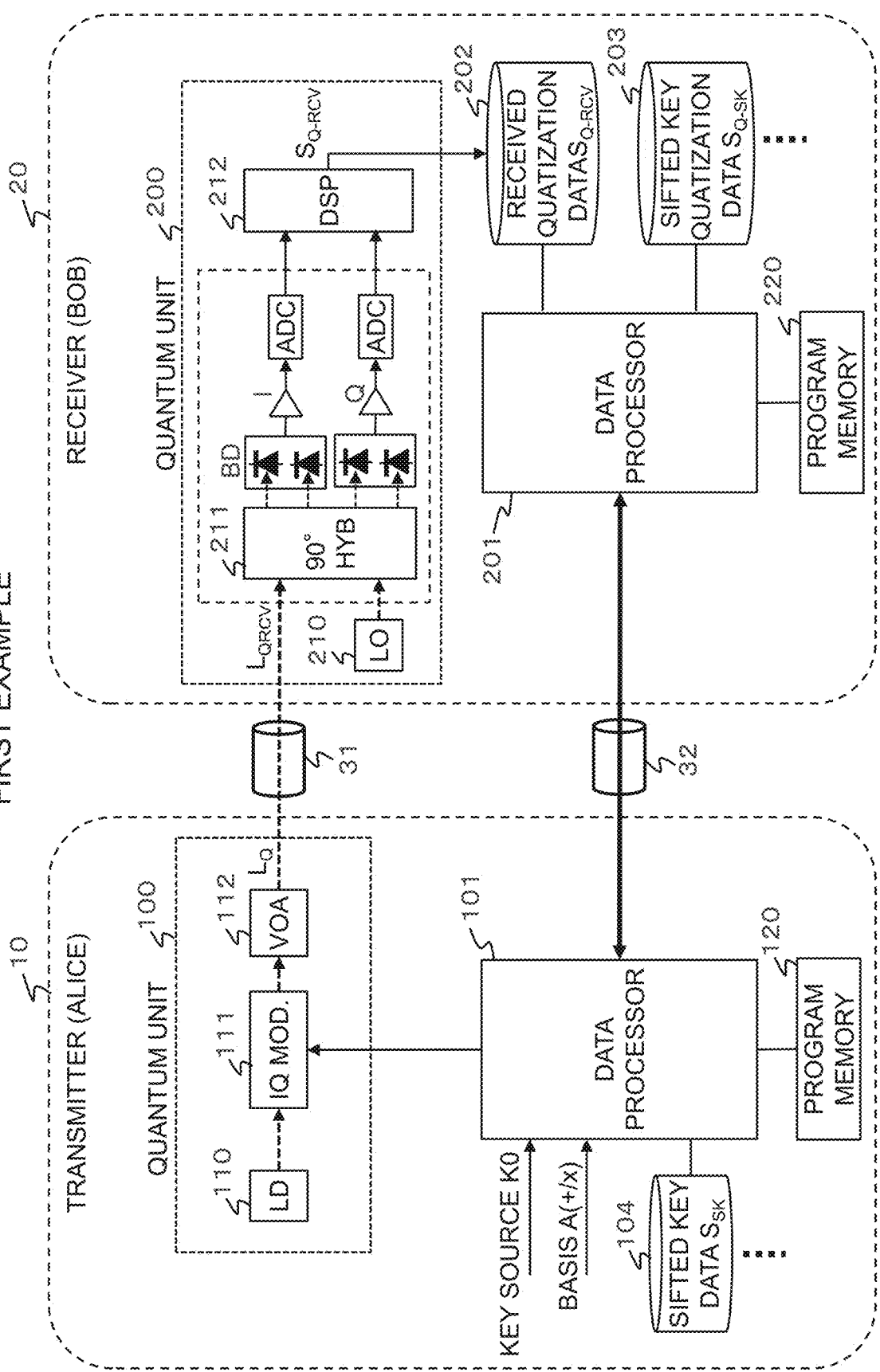
FIG. 8 is a block diagram illustrating the schematic configuration of a CV-QKD system according to a first example of the present invention.

As illustrated in FIG. 8, it is assumed that a CV-QKD system according to a first example of the present invention includes a transmitter 10 and a receiver 20 which are connected through a quantum channel 31 and a classical channel 32, as in the case of the QKD system shown in FIG. 2. Hereafter, blocks similar to those previously described with reference to FIG. 2 are denoted by the same reference numerals to simplify their explanations.

The transmitter 10 according to the present example includes a quantum unit 100, a data processor 101, a sifted key data storage section 104, a random number generator 102 and a random number memory 103, a corrected key storage section 105 and a final key storage section 106, as in the above example embodiment. However, in FIG. 8, some blocks are omitted for simplification.

The quantum unit 100 of the transmitter 10 includes a laser source 110, an IQ modulator 111, and a variable attenuator (VOA) 112. In actuality, the IQ modulator 111 may be a dual-polarization IQ modulator which includes an IQ modulator for X polarization and an IQ modulator for Y polarization. The respective IQ-modulated optical signals are polarization-multiplexed and transmitted as very weak light. Each IQ modulator may be composed of two Mach-Zehnder modulators connected in parallel. A dual-polarization IQ modulator may be composed of two IQ modulators each composed of two Mach-Zehnder modulators for each polarization.

The data processor 101 controls the IQ modulator 111 according to key source K0 and basis A. The IQ modulator 111 modulates laser light emitted from the laser source 110 as shown in FIG. 5. The variable attenuator 112 attenuates the IQ-modulated laser light to a very weak level with an optical power of less than 1 photon/bit. The very weak light $L_Q$ thus obtained is transmitted to the receiver 20 through the quantum channel 31.

The receiver 20 according to the present example includes a quantum unit 200, a data processor 201, a received quantization data storage section 202, a sifted key quantization data storage section 203, a corrected key storage section 204 and a final key storage section 205, as in the above example embodiment. However, in FIG. 8, some blocks are omitted for simplification.

The quantum unit 200 of the receiver 20 includes a local laser source 210, a 90° hybrid 211, balanced receivers (BDs), analog-to-digital converters (ADCs), and a digital signal processor (DSP) 212. In the case of dual-polarization IQ modulation system as described above, a detection module is provided, which polarization-demultiplexes the very weak light $L_{QRCV}$ arriving through the quantum channel 31. The detection module includes the 90° hybrid 211, BDs and ADCs for each of X and Y polarizations.

The 90° hybrid 211 inputs the weak light $L_{QRCV}$ and local laser light LO and interferes with them to extract the I and Q components of the electric field of the weak light $L_{QRCV}$ (coherent detection). These I and Q components are converted into electrical signals by BDs and sampled by ADCs, respectively. The DSP 212 performs wavelength dispersion compensation, polarization demultiplexing and equalization, etc. on the sampled I and Q components to output the received quantization data $S_{Q\text{-}RCV}$.

As described above, the reception method using interference of the very weak light $L_{QRCV}$ and the local laser light LO is referred to as coherent detection. In coherent detection, the optical amplification effect of signal light can be obtained by interfering the signal light with the local light of a strong optical power. Accordingly, even if the power of the signal light is very weak, less than 1 photon/bit, it can be detected using a general photodetector.

Particularly, in the field of digital coherent optical receivers, an intradyne method is in the mainstream. The intradyne method does not require frequency agreement between the very weak light $L_{QRCV}$ and the local laser light LO, but allows some frequency offset. Since effects of beat frequency due to the frequency offset can be compensated for in the DSP 212, the intradyne method has advantages such that the need for high-precision wavelength control of the local laser source 210 can be eliminated.

Figure 9:
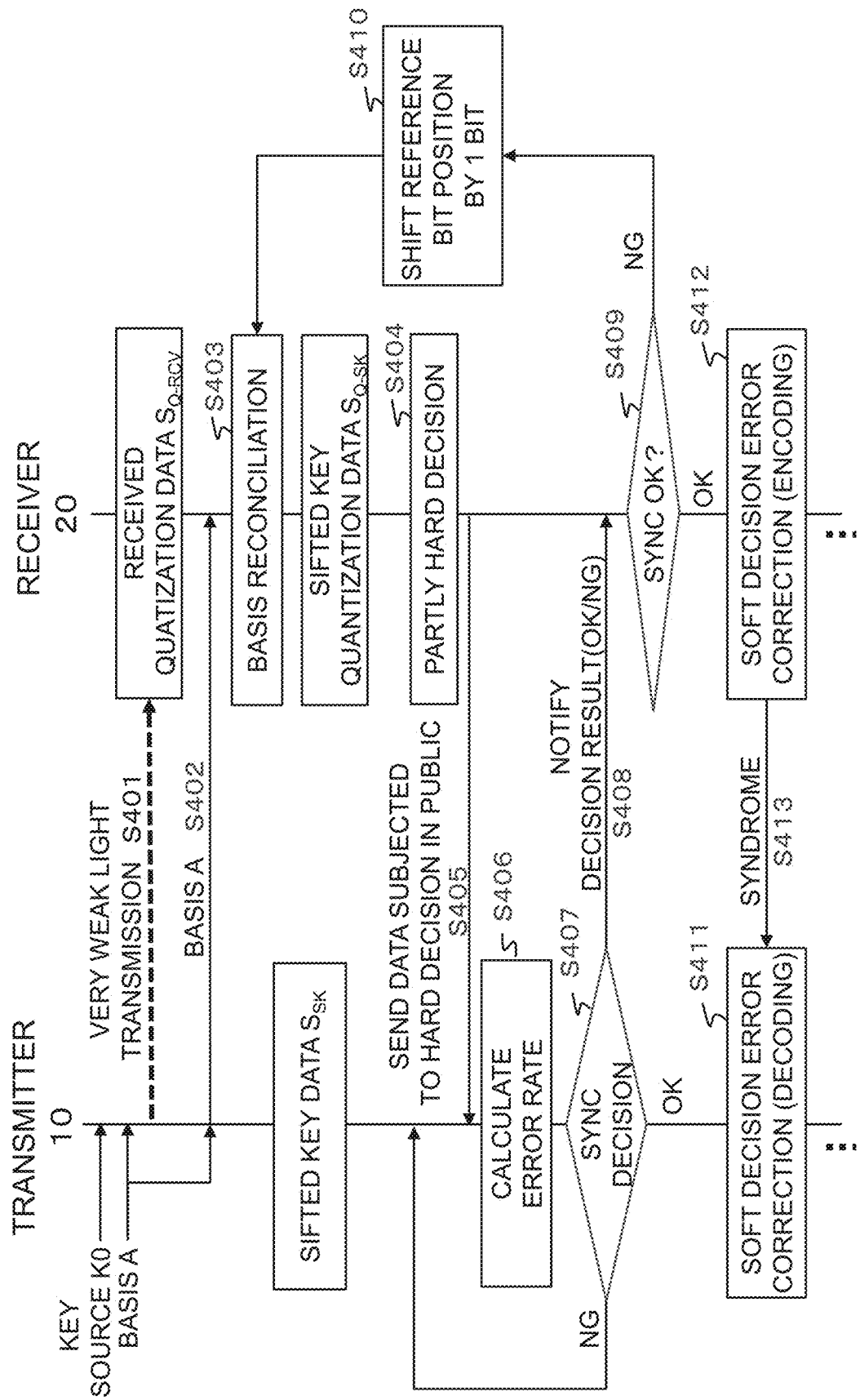
FIG. 9 is a sequence diagram illustrating a shared information generation method in the CV-QKD system according to the first example.

When the received quantization data $S_{Q\text{-}RCV}$ is obtained as described above, a final key is generated by the key generation process as illustrated in FIG. 9. The key generation process can be performed by executing computer programs on the data processor 101 of the transmitter 10 and the data processor 201 of the receiver 20. Such computer programs are stored in a program memory 120 of the transmitter 10 and a program memory 220 of the receiver 20, respectively.

2.2) Key Generation Process

Referring to FIG. 9, the data processor 101 of the transmitter 10 drives the IQ modulator 111 with random numbers as key source K0 and basis A (+ basis, x basis), and transmits very weak IQ-modulated light $L_Q$ through the quantum channel 31 (operation S401). The quantum unit 200 of the receiver 20 performs coherent detection of the arriving weak light $L_{QRCV}$. The data processor 101 assigns a serial bit number as reference bit position to each bit of received data and stores the received quantization data $S_{Q\text{-}RCV}$ together with the reference bit positions in the received quantization data storage section 202.

When the very weak light transmission with the key source K0 and basis A has been completed, the data processor 101 of the transmitter 10 notifies the random numbers (+, x) of basis A used for the very weak light transmission to the receiver 20 through the classical channel 32 (operation S402).

Based on the reference bit positions, the data processor 201 of the receiver 20 performs basis reconciliation of the received quantization data $S_{Q\text{-}RCV}$ according to the basis A received from the transmitter 10 as illustrated in FIG. 6 (operation S403). The basis reconciliation generates sifted key quantization data $S_{Q\text{-}SK}$, which is stored in the sifted key quantization data storage section 203. Meanwhile, the data processor 101 of the transmitter 10 has notified all basis A to the receiver 20, and then stores the corresponding key source K0 as sifted key data $S_{SK}$ in the sifted key data storage section 104.

Subsequently, the data processor 201 of the receiver 20 reads a predetermined frame portion $F_{HD}$ of the sifted key quantization data $S_{Q\text{-}SK}$, and performs hard decision on the predetermined frame portion $F_{HD}$ of the sifted key quantization data to generate hard-decision data (operation S404). The data processor 201 transmits the hard-decision data to the transmitter 10 through the classical channel 32 (operation S405).

The data processor 101 of the transmitter 10 compares the received hard-decision data with the corresponding sifted key data $S_{SK}$ to calculate an error rate (operation S406). The data processor 101 performs synchronization decision (synchronization NG or OK) depending on whether the error rate is greater than a predetermined threshold (operation S407). If the error rate is less than or equal to the predetermined threshold, the decision is made that synchronization is OK, and if the error rate exceeds the predetermined threshold, the decision is made that synchronization is NG. The predetermined threshold may be set at a value within the range 15 to 50% so that the amount of information leaked to eavesdroppers does not exceed that shared by the sender and receiver.

The data processor 101 notifies the result of synchronization decision (NG or OK) to the receiver 20 through the classical channel 32 (operation S408). If the synchronization decision is synchronization NG, the data processor 201 of the receiver 20 shifts the reference bit positions (bit numbers) by one bit (operation S410). Shifting the reference bit positions generates new bit numbers, by which basis reconciliation (S403), generation of hard decision data (S404), and synchronization decision (S405-S409) are executed with bases corresponding respectively to the new bit numbers.

If the result of synchronization decision is OK, the data processor 201 of the receiver 20 discards the data used for error rate calculation and performs soft-decision error correction (encoding) on the remaining sifted key quantization data to calculate error correction information, that is, syndrome (operation S412). The syndrome is calculated from the remaining sifted key quantization data $S_{Q\text{-}SK}$ and the predetermined check matrix, and is transmitted to the transmitter 10 through the classical channel 32 (operation S413).

The data processor 101 of the transmitter 10 discards the data used for error rate calculation from the sifted key data $S_{SK}$ and stores the remaining sifted key data. The data processor 101 then corrects the remaining sifted key data using the syndrome received from the receiver 20 and the predetermined check matrix to generate the corrected key $K1_A$ (operation S411).

The data processor 201 of the receiver 20 also generates the corrected key $K1_B$ by performing hard decision of the remaining sifted key quantization data. The final keys $QK_A$ and $QK_B$ are generated, as described in FIG. 3, by executing the privacy amplification processing on the corrected keys $K1_A$ and $K1_B$.

If the number of synchronization NGs exceeds a predetermined number, the data processor 201 discards the current frame and terminates the process, thereby allowing basis reconciliation for the next frame to be performed with reference bit positions shifted by one bit.

2.3) Advantageous Effect

As described above, according to the first example, it is possible to establish the synchronization of bit positions in basis reconciliation by performing hard decision of a part of the quantization data in the receiver before soft-decision error correction. This can suppress error correction failures caused by synchronization error of bit positions, thereby improving error correction performance and key generation rate in CV-QKD.

Further, according to the first example, the transmitter 10 notifies all of the basis A to the receiver 20, allowing the receiver 20 to perform basis reconciliation using the basis A. Accordingly, the advantage is that the sifted key generation efficiency is greatly increased since the key is not reduced in the basis reconciliation.

3. Second Example 3.1) System Configuration

Figure 10:
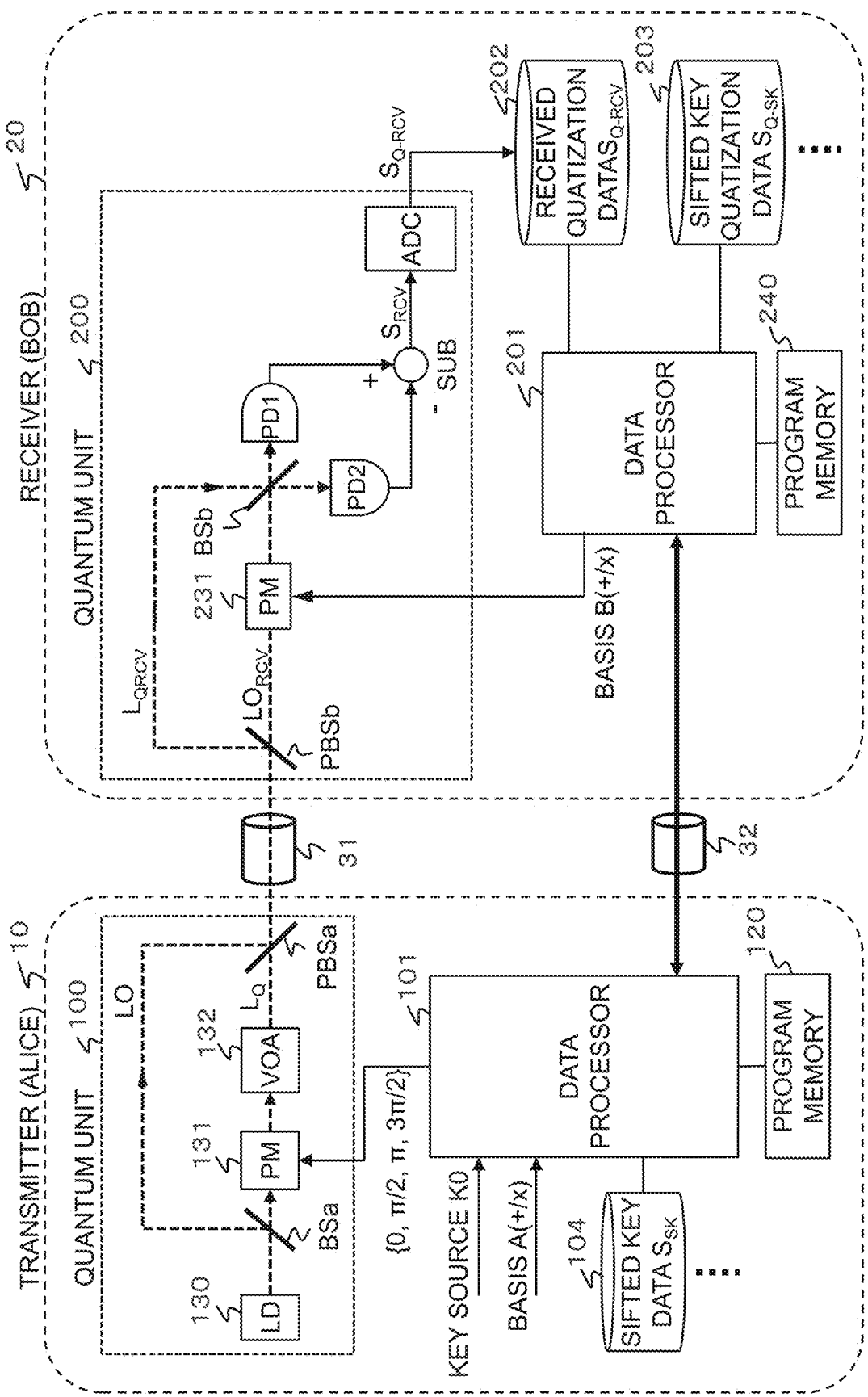
FIG. 10 is a block diagram illustrating the schematic configuration of a CV-QKD system according to a second example of the present invention.

As illustrated in FIG. 10, it is assumed that a CV-QKD system according to a second example of the present invention includes a transmitter 10 and a receiver 20 which are connected through a quantum channel 31 and a classical channel 32, as in the case of the first example shown in FIG. 8. Hereinafter, the functions that differ from those in the first example will be mainly described, and blocks similar to those previously described with reference to FIG. 8 are denoted by the same reference numerals to simplify their explanations.

The transmitter 10 according to the present example includes a quantum unit 100, a data processor 101, a sifted key data storage section 104, a random number generator 102 and a random number memory 103, a corrected key storage section 105 and a final key storage section 106, as in the above example embodiment. Note that in FIG. 10 some blocks are omitted for simplification.

The quantum unit 100 of the transmitter 10 includes a laser light source 130, a phase modulator (PM) 131, an non-polarizing beam splitter BSa, a variable attenuator (VOA) 132, and a polarizing beam splitter PBSa. The beam splitter BSa splits a light pulse input from the laser light source 130 into a reference light pulse LO on a reference path and a signal light pulse on a signal path at a predetermined split ratio. The split ratio is a value at which the reference pulse has a sufficiently greater intensity than the signal pulse, e.g., reference light intensity:signal light intensity=99:1.

The reference light pulse LO on the reference path enters the polarizing beam splitter PBSa as it is (or through a phase modulator not shown). The reference light pulse LO is reflected by the polarizing beam splitter PBSa to become a reference light pulse of the specified linear polarization and is transmitted to the receiver 20 through the quantum channel 31. The signal light pulse on the signal path enters the polarizing beam splitter PBSa as a very weak signal light pulse $L_Q$ through the phase modulator 131 and variable attenuator 132. The very weak signal light pulse $L_Q$ passes through the polarizing beam splitter PBSa and becomes a signal light pulse of linearly polarized light orthogonal to the reference light pulse. Such a signal light pulse is transmitted through the quantum channel 31 to the receiver 20.

In the present example, the data processor 101 controls the phase modulator 131 such that signal light pulses are phase-modulated according to four depths 0, $\pi/2$, $\pi$, and $3\pi/2$ corresponding to a random sequence of key source K0 and basis A as shown in FIG. 5. The signal light pulses thus phase-modulated becomes a very weak light pulse $L_Q$ of less than one photon/bit by the variable attenuator 132. Such very weak signal light pulses pass through the polarizing beam splitter PBSa and are transmitted to the receiver 20 through the quantum channel 31.

As in the first example, the phase modulator 131 may be a dual-polarization QPSK modulator. In the dual-polarization QPSK modulator, QPSK modulators are provided for X and Y polarizations, respectively. The QPSK-modulated optical signals are multiplexed and transmitted as very weak light.

The receiver 20 according to the present example includes a quantum unit 200, a data processor 201, a received quantization data storage section 202, a sifted key quantization data storage section 203, a corrected key storage section 204 and a final key storage section 205. Note that in FIG. 10 some blocks are omitted for simplification.

The quantum unit 200 of the receiver 20 includes a polarizing beam splitter PBSb, a phase modulator (PM) 231, a non-polarizing beam splitter BSb, photodetectors PD1 and PD2, a subtraction calculator SUB, and an analog-to-digital converter ADC. Light pulses arriving from transmitter 10 through quantum channel 31 are split by the polarizing beam splitter PBSb into received signal light pulse $L_{QRCV}$ and received reference light pulse $LO_{RCV}$.

The received signal light pulse $L_{QRCV}$ enters one input port of the beam splitter BSb as it is (or through a phase modulator not shown). The received reference light pulse $LO_{RCV}$ is modulated by the phase modulator 231 and enters the other input port of the beam splitter BSb. The phase modulator 231 is driven by the data processor 201 according to a random number, the basis B (+, x). In this example, the basis B (+, x) corresponds to the depths of phase modulation (0, π/2), respectively. The received signal light pulse $L_{QRCV}$ and the phase-modulated received reference light pulse $LO_{RCV}$ enter the beam splitter BSb.

The beam splitter BSb has transmittance and reflectance in equal proportions, which superimposes the received signal light pulse $L_{QRCV}$ and the received reference light pulse $LO_{RCV}$ to output two outgoing beams to the photodetectors PD1 and PD2, respectively. Accordingly, the beam splitter BSa of the transmitter 10 and the beam splitter BSb of the receiver 20 constitute one interferometer.

The subtraction calculator SUB inputs detection signals of the photodetectors PD1 and PD2 to calculate a difference between the detection signals and outputs a difference signal $S_{RCV}$ to the ADC. The ADC quantizes the difference signal $S_{RCV}$ to output the received quantization data $S_{Q-RCV}$, which is stored in the received quantization data storage section 202.

The receiving method that configures the interferometer as described above to interfere the received signal light pulse $L_{QRCV}$ with the received reference light pulse $LO_{RCV}$ is referred to as self-homodyne detection, which has the advantage that compensation for a wavelength difference between signal light and local light is not required. Self-homodyne detection also uses reference light with high optical power to obtain the optical amplification effect of the signal light. Accordingly, even when the power of the signal light is very weak, less than one photon/bit, it can be detected using a general photodetector.

Figure 11:
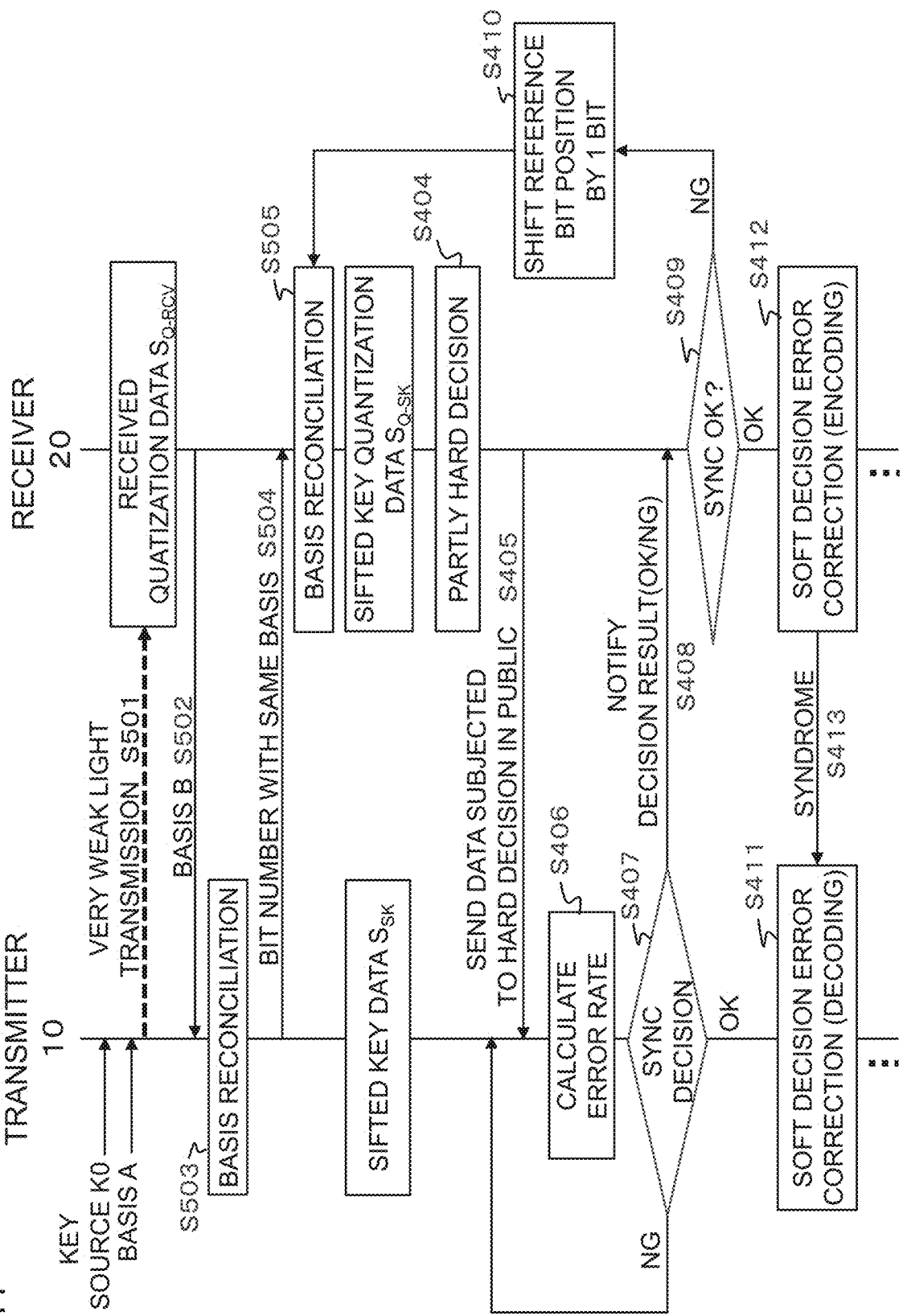
FIG. 11 is a sequence diagram illustrating the shared information generation method in the CV-QKD system according to the second example.

When the received quantization data $S_{Q-RCV}$ is obtained as described above, the final key is generated by the key generation process as illustrated in FIG. 11. The following key generation process can be implemented by executing a computer program stored in the program memory 140 on the data processor 101 of the transmitter 10 and a computer program stored in the program memory 240 of the receiver 20 on the data processor 201.

3.2) Key Generation Process

Referring to FIG. 11, the data processor 101 of the transmitter 10 drives the phase modulator 131 with random numbers as key source K0 and basis A (+ basis, x basis), and transmits a very weak and phase-modulated signal light pulse $L_Q$ and a reference light pulse LO through the quantum channel 31 (operation S501). The data processor 101 of transmitter 10 also transmits the bit numbers of the key source K0 and basis A to the receiver 20 through classical channel 32.

The data processor 201 of the receiver 20 drives the phase modulator 231 of the quantum unit 200 according to basis B on receiving side to phase-modulate the received reference light pulse $LO_{RCV}$. The quantum unit 200 outputs the received quantization data $S_{Q-RCV}$ by coherent detection of interfering the received reference light pulse $LO_{RCV}$ phase-modulated by the phase modulator 231 with the received signal light pulse $L_{QRCV}$. The data processor 201 assigns a sequential bit number as reference bit position and stores the receive quantization data $S_{Q-RCV}$ together with the reference bit positions in the receive quantization data storage section 202.

Subsequently, the data processor 201 of the receiver 20 informs the transmitter 10 of the receiver's basis B through the classical channel 32 (operation S502).

The data processor 101 of the transmitter 10 performs basis reconciliation by matching the basis B received from the receiver 20 with the basis A of the key source K0 to store the sifted key data $S_{SK}$ in the sifted key data storage section 104 (operation S503). In addition, the data processor 101 notifies the receiver 20 through the classical channel 32 of the bit number whose bases A and B match with each other (operation S504).

When receiving bit numbers with matched bases, the data processor 201 of the receiver 20 performs basis reconciliation of the received quantization data $S_{Q-RCV}$ stored in the received quantization data storage section 202 according to the reference bit positions (operation S505). The sifted key quantization data $S_{Q-SK}$ thus generated from the received quantization data $S_{Q-RCV}$ is stored in the sifted key quantization data storage section 203.

Hereinafter, the same data processing as in the first example is performed. That is, the data processor 201 of the receiver 20 performs hard-decision of the predetermined frame portion $F_{HD}$ of the sifted key quantization data $S_{Q-RCV}$ to generate hard-decision data (operation S404) and transmits the hard-decision data to the transmitter 10 through the classical channel 32 (operation S405).

The data processor 101 of the transmitter 10 calculates the error rate by comparing the received hard-decision data to the corresponding sifted key data $S_{SK}$ (operation S406), and performs synchronization decision of synchronization NG or OK (operation S407). The synchronization decision result (NG or OK) is notified to the receiver 20 through the classical channel 32 (operation S408).

If the synchronization decision is synchronization NG, the data processor 201 of the receiver 20 shifts the reference bit positions (bit numbers) by one bit (operation S410). Shifting the reference bit positions generates new bit numbers, by which basis reconciliation (S403), generation of hard decision data (S404), and synchronization decision (S405-S409) are executed with bases corresponding respectively to the new bit numbers. If synchronization NG exceeds a predetermined number of times, the data processor 201 discards the current frame and terminates the process, thereby allowing basis reconciliation for the next frame to be performed with reference bit positions shifted by one bit.

If the result of synchronization decision is OK, the data processor 201 of the receiver 20 discards the data used for error rate calculation and performs soft-decision error correction (encoding) on the remaining sifted key quantization data to calculate error correction information, that is, syndrome (operation S412). The syndrome is calculated from the remaining sifted key quantization data $S_{Q-SK}$ and the predetermined check matrix, and is transmitted to the transmitter 10 through the classical channel 32 (operation S413).

The data processor 101 of the transmitter 10 discards the data used for error rate calculation from the sifted key data $S_{SK}$ and stores the remaining sifted key data. The data processor 101 then corrects the remaining sifted key data using the syndrome received from the receiver 20 and the predetermined check matrix to generate the corrected key $K1_A$ (operation S411).

The data processor 201 of the receiver 20 also generates the corrected key $K1_B$ by performing hard decision of the remaining sifted key quantization data. The final keys $QK_A$ and $QK_B$ are generated, as described in FIG. 3, by executing the privacy amplification processing on the corrected keys $K1_A$ and $K1_B$.

3.3) Advantageous Effects

As described above, according to the second example, it is possible to establish the synchronization of bit positions in basis reconciliation by performing hard decision of a part of the quantization data in the receiver before soft-decision error correction. This can suppress error correction failures caused by synchronization error of bit positions, thereby improving error correction performance and key generation rate in CV-QKD.

Further, according to the second example, both the transmitter 10 and the receiver 20 generate random numbers and then generate sifted keys only with data whose bases match, allowing efficient generation of sifted keys and improved security.

4. Additional Notes

While the present disclosure has been particularly shown and described with reference to example embodiments thereof, the present disclosure is not limited to these example embodiments. It will be understood by those of ordinary skill in the art that various changes in form and details may be made therein without departing from the spirit and scope of the present disclosure as defined by the claims. And each embodiment can be appropriately combined with other embodiments.

The present invention may be embodied in other specific forms without departing from the spirit or essential characteristics thereof. The above-described illustrative embodiment and examples are therefore to be considered in all respects as illustrative and not restrictive, the scope of the invention being indicated by the appended claims rather than by the foregoing description, and all changes which come within the meaning and range of equivalency of the claims are therefore intended to be embraced therein. Part or all of the above-described illustrative embodiments can also be described as, but are not limited to, the following additional notes.

Additional Note 1

A method for generating shared information by continuous-variable quantum key distribution (CV-QKD) between a first communication device and a second communication device connected through a first channel and a second channel, the method comprising:
a) at the first communication device, transmitting very weak light to the second communication device through the first channel, wherein the very weak light is quadrature-modulated according to a first random number sequence and a second random number sequence, each of which has bit positions relatively determined;
b) at the second communication device, generating received quantization data by performing coherent detection of very weak light received through the first channel;
c) at the second communication device, setting reference bit positions for shared information generation; and generating sifted key quantization data from the received quantization data based on at least first part of the first random number sequence; at the first communication device, generating sifted key data from second part of the second random number sequence corresponding to the at least first part;
d) at the second communication device, generating hard-decision data for bit position synchronization decision by performing hard decision of a part of the sifted key quantization data;
e) if bit position synchronization is established between the hard-decision data and the sifted key data, at the first communication device, discarding a part of the sifted key data used for the bit position synchronization decision to generate remaining sifted key data; at the second communication data, discarding the part of the sifted key quantization data used for the hard decision to generate remaining sifted key quantization data; and
f) at the first communication device and the second communication device, generating shared information by performing soft-decision error correction processing on the remaining sifted key data and the remaining sifted key quantization data.

Additional Note 2

The method according to additional note 1, wherein the e) further comprises, if the bit position synchronization is not established, returning to the c) to change setting of the reference bit positions.

Additional Note 3

The method according to additional note 2, wherein the c) further comprises shifting the reference bit positions by one bit.

Additional Note 4

The method according to any one of additional notes 1-3, wherein in the e), one of the first communication device and the second communication device determines whether the bit position synchronization is established or not, based on an error rate calculated from the hard-decision data and a corresponding part of the sifted key data.

Additional Note 5

The method according to any one of additional notes 1-3, wherein in the f),
the second communication device calculates error correction information by performing the soft-decision error correction processing on the remaining sifted key quantization data and transmits the error correction information to the first communication device through the second channel;
the first communication device generates first shared information from the remaining sifted key data by decoding the error correction information, and the second communication device generates second shared information from the remaining sifted key quantization data by soft decision.

Additional Note 6

The method according to any one of additional notes 1-3, wherein in the c), the first communication device transmits the first random number sequence to the second communication device through the second channel, the second communication device generates the sifted key quantization data from the received quantization data based on the first random number sequence, and the first communication device processes the second random number sequence as the sifted key data.

Additional Note 7

The method according to any one of additional notes 1-3, wherein in the c), the second communication device generates a third random number sequence to transmit it to the first communication device through the second channel, the first communication device compares the first random number sequence with the third random number sequence and transmits, to the second communication device, the at least first part of the first random number sequence at bit positions matching the first random number sequence with the third random number sequence.

Additional Note 8

The method according to any one of additional notes 1-3, wherein the first communication device and the second communication device perform privacy amplification processing based on the shared information to generate a final key.

Additional Note 9

The method according to any one of additional notes 1-3, wherein the very weak light has an optical power of one photon or less per pulse.

Additional Note 10

A receiver connected to a transmitter through a first channel and a second channel in a continuous-variable quantum key distribution (CV-QKD) system, the receiver comprising:
  a quantum unit configured to receive very weak light from the transmitter through the first channel to output received quantization data by coherent detection, wherein the very weak light is quadrature-modulated according to a first random number sequence and a second random number sequence, each of which has bit positions relatively determined; and
  a data processor configured to generate shared information from the received quantization data by communicating with the transmitter through the second channel,
  wherein the data processor is further configured to:
  a) set reference bit positions for shared information generation and generating sifted key quantization data from the received quantization data based on at least first part of the first random number sequence;
  b) generate hard-decision data for bit position synchronization decision by performing hard decision on part of the sifted key quantization data;
  c) if bit position synchronization is established between the hard-decision data and the sifted key data of the transmitter, discard the part of the sifted key quantization data used for the hard decision to generate remaining sifted key quantization data; and
  d) perform soft-decision error correction processing on the remaining sifted key quantization data to generate the shared information.

Additional Note 11

The receiver according to additional note 10, wherein the data processor is further configured to, if the bit position synchronization is not established in the c), return to the a) to change setting of the reference bit positions.

Additional Note 12

The receiver according to additional note 11, wherein the data processor is further configured to, in the a), shift the reference bit positions by one bit.

Additional Note 13

The receiver according to any one of additional notes 10-12, wherein the data processor is further configured to, in the c), determine whether the bit position synchronization is established or not, based on an error rate calculated from the hard-decision data and a corresponding part of the sifted key data.

Additional Note 14

The receiver according to any one of additional notes 10-12, wherein the data processor is further configured to, in the c), receive a synchronization decision result from the transmitter, wherein the synchronization decision result indicates whether the bit position synchronization is established or not based on an error rate calculated from the hard-decision data and a corresponding part of the sifted key data.

Additional Note 15

The receiver according to any one of additional notes 10-12, wherein the data processor is further configured to: in the d), calculate error correction information by performing the soft-decision error correction processing on the remaining sifted key quantization data; transmit the error correction information to the transmitter through the second channel; and generate the shared information by performing soft decision on the remaining sifted key quantization data.

Additional Note 16

The receiver according to any one of additional notes 10-12, wherein the data processor is further configured to: in the a),
  receive the first random number sequence from the transmitter through the second channel; and
  generate the sifted key quantization data from the received quantization data based on the first random number sequence.

Additional Note 17

The receiver according to any one of additional notes 10-12, wherein the data processor is further configured to: in the a),
  transmit a third random number sequence through the second channel; and
  receive the at least first part of the first random number sequence at bit positions matching the first random number sequence with the third random number sequence.

Additional Note 18

The receiver according to any one of additional notes 10-12, wherein the data processor is further configured to perform privacy amplification processing based on the shared information to generate a final key.

Additional Note 19

The receiver according to any one of additional notes 10-12, wherein the very weak light has an optical power of one photon or less per pulse.

Additional note 20

A transmitter connected to the receiver according to additional note 15, the transmitter comprising:
a transmitting-side quantum unit configured to transmit the very weak light to the receiver through the first channel; and
a transmitting-side data processor configured to generate shared information based on the second random number sequence by communicating with the receiver through the second channel,
the transmitting-side data processor further configured to:
generate the sifted key data from the second random number sequence corresponding to the at least first part of the first random number sequence;
transmit, to the receiver, a synchronization decision result obtained based on an error rate calculated from hard-decision data received from the receiver and a corresponding part of the sifted key data; and
generate shared information from the remaining sifted key data according to the error correction information received from the receiver.

Additional Note 21

A communication control method at a receiver connected to a transmitter through a first channel and a second channel in a continuous-variable quantum key distribution (CV-QKD) system, the method comprising:
by a quantum unit, receiving very weak light from the transmitter through the first channel to output received quantization data by coherent detection, wherein the very weak light is quadrature-modulated according to a first random number sequence and a second random number sequence, each of which has bit positions relatively determined; and
by a data processor,
a) setting reference bit positions for shared information generation and generating sifted key quantization data from the received quantization data based on at least first part of the first random number sequence;
b) generating hard-decision data for bit position synchronization decision by performing hard decision on part of the sifted key quantization data;
c) if bit position synchronization is established between the hard-decision data and the sifted key data of the transmitter, discarding the part of the sifted key quantization data used for the hard decision to generate remaining sifted key quantization data; and
d) performing soft-decision error correction processing on the remaining sifted key quantization data to generate the shared information.

Additional Note 22

The communication control method according to additional note 21, wherein the c) further comprises, if the bit position synchronization is not established, returning to the a) to change setting of the reference bit positions.

Additional Note 23

The communication control method according to additional note 22, wherein the a) further comprises shifting the reference bit positions by one bit.

Additional Note 24

The communication control method according to any one of additional notes 21-23, wherein the c) further comprises determining whether the bit position synchronization is established or not, based on an error rate calculated from the hard-decision data and a corresponding part of the sifted key data.

Additional Note 25

The communication control method according to any one of additional notes 21-23, wherein the c) further comprises receiving a synchronization decision result from the transmitter, wherein the synchronization decision result indicates whether the bit position synchronization is established or not based on an error rate calculated from the hard-decision data and a corresponding part of the sifted key data.

Additional Note 26

The communication control method according to any one of additional notes 21-23, wherein the d) further comprises: calculating error correction information by performing the soft-decision error correction processing on the remaining sifted key quantization data; transmitting the error correction information to the transmitter through the second channel; and generating the shared information by performing soft decision on the remaining sifted key quantization data.

Additional Note 27

The communication control method according to any one of additional notes 21-23, wherein the a) further comprises:
receiving the first random number sequence from the transmitter through the second channel; and
generating the sifted key quantization data from the received quantization data based on the first random number sequence.

Additional Note 28

The communication control method according to any one of additional notes 21-23, wherein the a) further comprises:
transmitting a third random number sequence through the second channel; and
receiving the at least first part of the first random number sequence at bit positions matching the first random number sequence with the third random number sequence.

Additional Note 29

A program for functioning a computer as a receiver connected to a transmitter through a first channel and a second channel in a continuous-variable quantum key distribution (CV-QKD) system, the program comprising a set of instructions to:
by a quantum unit, receive very weak light from the transmitter through the first channel to generate received quantization data by coherent detection, wherein the very weak light is quadrature-modulated according to a first random number sequence and a second random number sequence, each of which has bit positions relatively determined; and by a data processor,
a) set reference bit positions for shared information generation and generating sifted key quantization data from the received quantization data based on at least first part of the first random number sequence;
b) generate hard-decision data for bit position synchronization decision by performing hard decision on part of the sifted key quantization data;
c) if bit position synchronization is established between the hard-decision data and the sifted key data of the transmitter, discard the part of the sifted key quantization data used for the hard decision to generate remaining sifted key quantization data; and
d) perform soft-decision error correction processing on the remaining sifted key quantization data to generate the shared information.

Additional Note 30

A method for deciding synchronization of shared information generated by continuous-variable quantum key distribution (CV-QKD) between a first communication device and a second communication device connected through a first channel and a second channel, the method comprising:
a) at the first communication device, transmitting very weak light to the second communication device through the first channel, wherein the very weak light is quadrature-modulated according to a first random number sequence and a second random number sequence, each of which has bit positions relatively determined;
b) at the second communication device, generating received quantization data by performing coherent detection of very weak light received through the first channel;
c) at the second communication device, setting reference bit positions for shared information generation; and generating sifted key quantization data from the received quantization data based on at least first part of the first random number sequence; at the first communication device, generating sifted key data from second part of the second random number sequence corresponding to the at least first part;
d) at the second communication device, generating hard-decision data for bit position synchronization decision by performing hard decision of a part of the sifted key quantization data; and
e) at one of the first communication device and the second communication device, deciding whether bit position synchronization is established or not, based on an error rate calculated from the hard-decision data and a corresponding part of the sifted key data.

Additional Note 31

The method according to additional note 30, wherein the e) further comprises:
if the error rate is not greater than a predetermined threshold, discarding data used for bit position synchronization decision from the sifted key quantization data and the sifted key data, respectively, to generate the shared information by performing error correction processing on remaining sifted key quantization data and remaining sifted key data; and
if the error rate is greater than a predetermined threshold, returning to the c) to change setting of the reference bit positions.

Additional Note 32

The method according to additional note 31, wherein the error correction processing comprises:
at the second communication device, calculating error correction information by performing the soft-decision error correction processing on the remaining sifted key quantization data and transmitting the error correction information to the first communication device through the second channel; and
at the first communication device, generating first shared information from the remaining sifted key data by decoding the error correction information, and the second communication device generates second shared information from the remaining sifted key quantization data by soft decision.

Additional Note 33

The method according to additional note 31 or 32, wherein the e) further comprises: if the error rate is greater than a predetermined threshold, returning to the c) to shift the reference bit positions by one bit.

Additional Note 34

The method according to any one of additional notes 28-30, wherein in the c), the first communication device transmits the first random number sequence to the second communication device through the second channel, the second communication device generates the sifted key quantization data from the received quantization data based on the first random number sequence, and the first communication device processes the second random number sequence as the sifted key data.

Additional Note 35

The method according to any one of additional notes 28-30, wherein in the c), the second communication device generates a third random number sequence to transmit it to the first communication device through the second channel, the first communication device compares the first random number sequence with the third random number sequence and transmits, to the second communication device, the at least first part of the first random number sequence at bit positions matching the first random number sequence with the third random number sequence.

Additional Note 36

A continuous-variable quantum key distribution (CV-QKD) system comprising a transmitter and a receiver connected through a first channel and a second channel,
the transmitter configured to transmit very weak light through the first channel, wherein the very weak light is quadrature-modulated according to a first random number sequence and a second random number sequence, each of which has bit positions relatively determined;

the receiver configured to:
  receive very weak light from the transmitter through the first channel to generate received quantization data by coherent detection;
  set reference bit positions for shared information generation;
  generate sifted key quantization data from the received quantization data based on at least first part of the first random number sequence; and
  generate hard-decision data for bit position synchronization decision by performing hard decision on part of the sifted key quantization data;
  if bit position synchronization is established between the hard-decision data and sifted key data of the transmitter, discard the part of the sifted key quantization data used for the hard decision to generate remaining sifted key quantization data,
wherein the transmitter is further configured to:
  generate the sifted key data from the second random number sequence corresponding to the at least first part of the first random number sequence; and
  if the bit position synchronization is established between the hard-decision data and the sifted key data, discard a part of the sifted key data used for the bit position synchronization decision to generate remaining sifted key data,
wherein the transmitter and the receiver generate shared information by performing soft-decision error correction processing on the remaining sifted key data and the remaining sifted key quantization data, respectively.

An illustrative example embodiment or example is applicable to CV-QKD systems.

DESCRIPTION OF SIGNS

10 Transmitter
20 Receiver
31 Quantum channel
32 Classic channel
100 Quantum unit
101 Data Processor
101*a* Basis reconciliation section
101*b* Synchronization decision section
101*c* Soft-decision error correction section (decoding)
101*d* Privacy amplification section
102 Random number generator
103 Random number memory
104 Sifted key data storage section
105 Corrected key storage section
106 Final key storage section
200 Quantum unit
201 Data Processor
201*a* Basis reconciliation section
201*b* Hard-decision section
201*c* Soft-decision error correction section (encoding)
201*d* Privacy amplification section
202 Received quantization data storage section
203 Sifted key quantization data storage section
204 Corrected key storage section
205 Final key storage section

The invention claimed is:

1. A communication device connected to another communication device through a first channel and a second channel in a continuous-variable quantum key distribution (CV-QKD) system, the communication device comprising:
   a receiver configured to receive signal light from the another communication device through the first channel to generate received quantization data by coherent detection, wherein the signal light is quadrature-modulated according to a first random number sequence and a second random number sequence which have predetermined bit positions at the another communication device; and
   at least one processor configured to generate shared information from the received quantization data by communicating with the another communication device through the second channel,
   wherein the at least one processor is further configured to:
   a) set reference bit positions for basis reconciliation with the another communication device, wherein the basis reconciliation generates sifted key quantization data from the received quantization data according to the reference bit positions;
   b) perform hard decision on a part of the sifted key quantization data to generate hard-decision data;
   c) perform bit position synchronization decision whether bit position synchronization is established between the hard-decision data and sifted key data which is obtained by the basis reconciliation at the another communication device; and
   d) in response to establishment of bit position synchronization, perform soft-decision error correction processing between the communication device and the another communication device to generate the shared information.

2. The communication device according to claim 1, wherein the at least one processor is further configured to, if the bit position synchronization is not established in the c), return to the a) to change setting of the reference bit positions.

3. The communication device according to claim 2, wherein the at least one processor is further configured to, in the a), shift the reference bit positions by one bit.

4. The communication device according to claim 1, wherein the at least one processor is further configured to, in the c), decide whether the bit position synchronization is established or not, depending on an error rate calculated from the hard-decision data and a corresponding part of the sifted key data.

5. The communication device according to claim 1, wherein the at least one processor is further configured to, in the c), receive a synchronization decision result from the another communication device, wherein the synchronization decision result indicates whether the bit position synchronization is established or not based on an error rate calculated from the hard-decision data and a corresponding part of the sifted key data.

6. The communication device according to claim 1, wherein the at least one processor is further configured to: in the d),
   calculate error correction information by performing the soft-decision error correction processing; and
   transmit the error correction information to the another communication device through the second channel, wherein the another communication device performs the soft-decision error correction processing based on the error correction information to generate the shared information.

7. The communication device according to claim 1, wherein the another communication device connected to the communication device comprises:
   a transmitter configured to transmit the signal light to the receiver through the first channel; and at least one transmitting-side processor configured to generate the shared information based on the second random number sequence by communicating with the communication device through the second channel, the at least one transmitting-side processor further configured to:

generate the sifted key data from the second random number sequence by the basis reconciliation with the communication device;

transmit, to the communication device, a synchronization decision result obtained based on an error rate calculated from the hard-decision data received from the communication device and a corresponding part of the sifted key data; and in response to establishment of bit position synchronization, perform soft-decision error correction processing to generate the shared information.

8. A communication control method at a communication device connected to another communication device through a first channel and a second channel in a continuous-variable quantum key distribution (CV-QKD) system, the method comprising:

by a receiver, receiving signal light from the another communication device through the first channel to generate received quantization data by coherent detection, wherein the signal light is quadrature-modulated according to a first random number sequence and a second random number sequence which have predetermined bit positions at the another communication device; and by at least one data processor, a) setting reference bit positions for basis reconciliation with the another communication device, wherein the basis reconciliation generates sifted key quantization data from the received quantization data according to the reference bit positions;

b) performing hard decision on a part of the sifted key quantization data to generate hard-decision data;

c) performing bit position synchronization decision whether bit position synchronization is established between the hard-decision data and sifted key data which is obtained by the basis reconciliation at the another communication device; and d) in response to establishment of bit position synchronization, performing soft-decision error correction processing between the communication device and the another communication device to generate the shared information.

9. The communication control method according to claim 8, wherein the c) further comprises, if the bit position synchronization is not established, returning to the a) to change setting of the reference bit positions.

10. The communication control method according to claim 9, wherein the a) further comprises shifting the reference bit positions by one bit.

11. The communication control method according to claim 8, wherein the c) further comprises: deciding whether the bit position synchronization is established or not, based on an error rate calculated from the hard-decision data and a corresponding part of the sifted key data.

12. The communication control method according to claim 8, wherein the c) further comprises: receiving a synchronization decision result from the another communication device, wherein the synchronization decision result indicates whether the bit position synchronization is established or not based on an error rate calculated from the hard-decision data and a corresponding part of the sifted key data.

13. The communication control method according to claim 8, wherein the d) further comprises:

calculating error correction information by performing the soft-decision error correction processing; and transmitting the error correction information to the another communication device through the second channel, wherein the another communication device performs the soft-decision error correction processing based on the error correction information to generate the shared information.

14. A method for generating shared information by continuous-variable quantum key distribution (CV-QKD) between a first communication device and a second communication device connected through a first channel and a second channel, the method comprising:

a) at the first communication device, transmitting signal light to the second communication device through the first channel, wherein the signal light is quadrature-modulated according to a first random number sequence and a second random number sequence which have predetermined bit positions at the first communication device;

b) at the second communication device, generating received quantization data by performing coherent detection of signal light arriving through the first channel;

c) at the second communication device, setting reference bit positions for basis reconciliation with the first communication device, wherein the basis reconciliation generates sifted key quantization data from the received quantization data according to the reference bit positions; and at the first communication device, the basis reconciliation generates sifted key data based on the predetermined bit positions in the second random number sequence;

d) at the second communication device, performing hard decision on a part of the sifted key quantization data to generate hard-decision data;

e) at one of the first and second communication devices, performing bit position synchronization decision whether bit position synchronization is established between the hard-decision data and the sifted key data; and f) in response to establishment of bit position synchronization, performing soft-decision error correction processing between the first communication device and the second communication device to generate the shared information.

15. The method according to claim 14, wherein the f) further comprises, if the bit position synchronization is not established, returning to the c) to change setting of the reference bit positions.

16. The method according to claim 15, wherein the c) further comprises shifting the reference bit positions by one bit.

17. The method according to claim 14, wherein in the f), one of the first communication device and the second communication device decides whether the bit position synchronization is established or not, based on an error rate calculated from the hard-decision data and a corresponding part of the sifted key data.

18. The method according to claim 14, wherein in the f), the second communication device calculates error correction information by performing the soft-decision error correction processing and transmits the error correction information to the first communication device through the second channel;

the first communication device generates the shared information based on the error correction information.

19. The method according to claim 14, wherein the first communication device and the second communication device perform privacy amplification processing based on the shared information to generate a final key.

20. The method according to claim 14, wherein the signal light has an optical power of one photon or less per pulse.

* * * * *